(12) United States Patent
Chan et al.

(10) Patent No.: US 11,511,887 B2
(45) Date of Patent: *Nov. 29, 2022

(54) COMPOUND CONTOUR VACUUM TRACK FOR AUTOMATION OF FINAL ASSEMBLY FROM THE INTERIOR OF A FUSELAGE

(71) Applicant: The Boeing Company, Chicago, IL (US)

(72) Inventors: Kwok Tung Chan, Seattle, WA (US); Tanni Sisco, Mukilteo, WA (US); John Hartmann, Seattle, WA (US); Scott Charles Tomchick, Edmonds, WA (US); Frank Charles Mestemacher, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/899,178

(22) Filed: Jun. 11, 2020

(65) Prior Publication Data

US 2020/0299000 A1 Sep. 24, 2020

Related U.S. Application Data

(63) Continuation of application No. 15/365,426, filed on Nov. 30, 2016, now Pat. No. 10,710,747, which is a
(Continued)

(51) Int. Cl.
*B64F 5/10* (2017.01)
*B21J 15/14* (2006.01)
(Continued)

(52) U.S. Cl.
CPC .............. *B64F 5/10* (2017.01); *B21J 15/022* (2013.01); *B21J 15/142* (2013.01);
(Continued)

(58) Field of Classification Search
CPC ........ B21J 15/022; B21J 15/10; B21J 15/105; B21J 15/142; B23P 11/00; B23P 19/00;
(Continued)

(56) References Cited

U.S. PATENT DOCUMENTS 3,575,364 A 4/1971 Frederick
5,687,463 A 11/1997 Michalewski et al.
(Continued)

FOREIGN PATENT DOCUMENTS

CN 1982040 A 5/2011
CN 104819196 A 8/2015
(Continued)

OTHER PUBLICATIONS

Canadian Office Action dated Dec. 1, 2020 for CA Application No. 2,979,790.
(Continued)

*Primary Examiner* — Matthew P Travers
(74) *Attorney, Agent, or Firm* — Gates & Cooper LLP

(57) ABSTRACT

A compound contour vacuum track, and an automated fastening machine using the track, for automation of final assembly inside an aircraft fuselage. The track is mounted at an angle to a surface, such as an inside surface of the fuselage, wherein the surface has one or more holes through which fasteners are inserted. The automated fastening machine is mounted on the track to traverse the track while performing fastening functions and steps. The automated fastening machine includes a carriage, arm, and end effector, wherein the arm is mounted on the carriage and the end effector is mounted on the arm. The carriage is attached to the track for positioning the arm and end effector, the arm is attached to the carriage for positioning the end effector, and the end effector is attached to the arm for installing the fasteners into the holes of the surface.

16 Claims, 31 Drawing Sheets

Related U.S. Application Data continuation of application No. 15/365,441, filed on Nov. 30, 2016, now Pat. No. 10,723,484.

(51) Int. Cl.
 *B21J 15/02* (2006.01)
 *B23Q 9/00* (2006.01)
 *B64C 1/06* (2006.01)

(52) U.S. Cl.
 CPC ........ *B23P 2700/01* (2013.01); *B23Q 9/0014* (2013.01); *B64C 1/066* (2013.01); *B64C 1/068* (2013.01)

(58) Field of Classification Search
 CPC .... B23P 19/04; B23P 2700/01; B23Q 9/0007; B23Q 9/0042; B23Q 2210/006; B23Q 2210/008; B23Q 5/385; B23Q 9/0014; B64C 1/068; B64C 1/12; B64F 5/10; Y10T 29/49947–49957; Y10T 29/53983
 See application file for complete search history.

(56) References Cited

U.S. PATENT DOCUMENTS

| | | |
|---|---|---|
| 6,073,326 A | 6/2000 | Banks et al. |
| 6,098,260 A | 8/2000 | Sarh |
| 6,172,374 B1 | 1/2001 | Banks et al. |
| 6,843,328 B2 | 1/2005 | Boyl-Davis et al. |
| 7,216,408 B2 | 5/2007 | Boyl-Davis et al. |
| 7,488,144 B2 | 2/2009 | Boyl-Davis et al. |
| 7,794,183 B2 | 9/2010 | Wright et al. |
| 9,868,148 B2 | 1/2018 | Hauw |
| 2006/0218780 A1 | 10/2006 | Lewis et al. |
| 2007/0036618 A1 | 2/2007 | Fritsche et al. |
| 2008/0010515 A1 | 5/2008 | Boyl-Davis et al. |
| 2008/0105158 A1* | 5/2008 | Boyl-Davis ......... B23Q 9/0042 105/29.1 |
| 2008/0181733 A1 | 7/2008 | Wright et al. |
| 2012/0210802 A1 | 8/2012 | Sarh et al. |
| 2014/0339394 A1 | 11/2014 | Perla et al. |
| 2016/0009416 A1 | 1/2016 | Oberoi et al. |
| 2016/0009420 A1 | 1/2016 | Oberoi et al. |
| 2016/0167109 A1 | 6/2016 | Hauw |

FOREIGN PATENT DOCUMENTS

| | | |
|---|---|---|
| CN | 107127716 A | 9/2017 |
| DE | 102006001385 | 6/2007 |
| EP | 1563950 A1 | 8/2005 |
| EP | 2859990 | 4/2015 |
| EP | 1463605 B1 | 2/2016 |
| FR | 2387070 A1 | 11/1978 |
| WO | WO2010019320 A1 | 2/2010 |

OTHER PUBLICATIONS

Canadian Office Action dated Dec. 1, 2020 for CA Application No. 2,979,862.
Chinese Office Action dated Sep. 15, 2020 for CN application No. 201711425598.
Zieve et al., "Rivet Gripper and Offset Collar Gripper for Wing Panel Riveting," Society of Automotive Engineers, Inc., copyright 1999, 10 pages. https://www.electroimpact.com/WhitePapers/1999-01-3430.pdf.
Chan, Jr. et al., "Automated Fastening Machine Using a Compound Contour Vacuum Track for Automation of Final Assembly from the Interior of a Fuselage," U.S. Appl. No. 15/365,441, filed Nov. 30, 2016, 58 pages.
Chan, Jr. et al., "Compound Contour Vacuum Track for Automation of Final Assembly from the Interior of a Fuselage," U.S. Appl. No. 15/365,426, filed Nov. 30, 2016, 58 pages.
Extended European Search Report dated Jan. 26, 2018 for EP application No. 17204696.3.
European Communication dated Mar. 22, 2019 for EP Application No. 17202587.6.
European Communication dated Jan. 30, 2020 for EP Application No. 19197808.9.
Brazilian Office Action dated Oct. 18, 2021 for Brazilian Patent Application No. BR102017024389-3.
Canadian Office Action dated Aug. 4, 2021 for CA Application No. 2,979,790.
Canadian Office Action dated Mar. 25, 2022 for Canadian Application No. 2,979,790.

\* cited by examiner

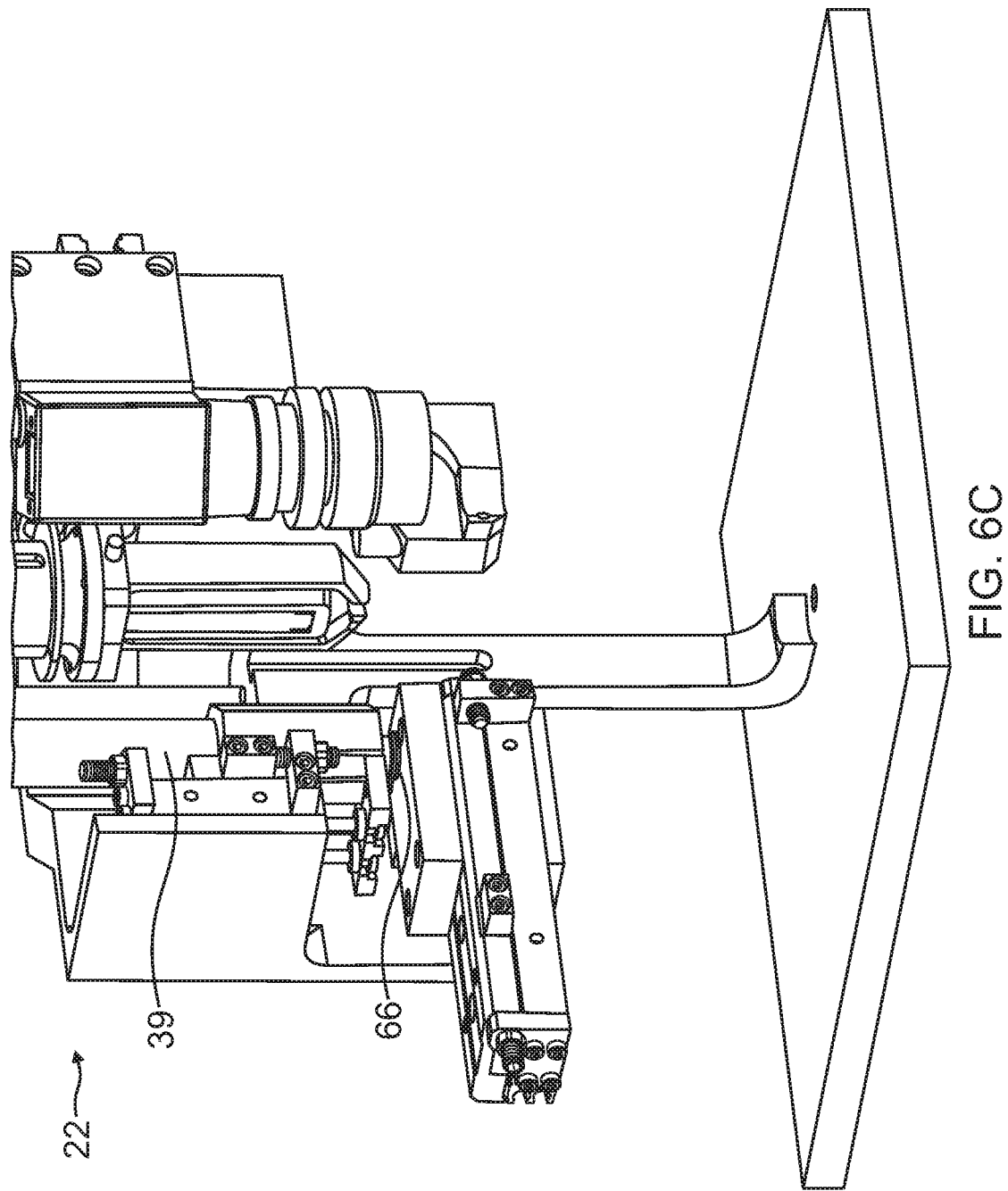

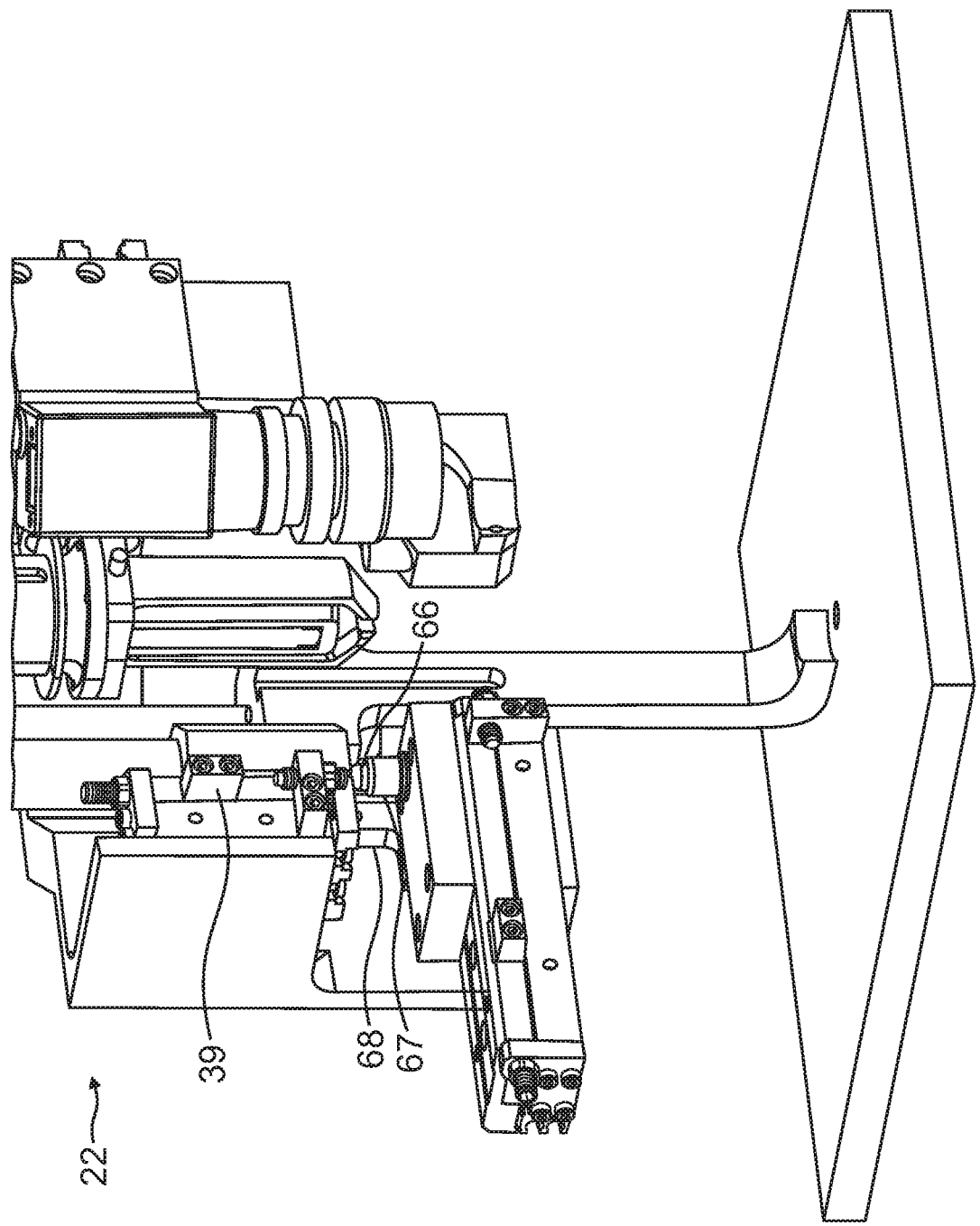

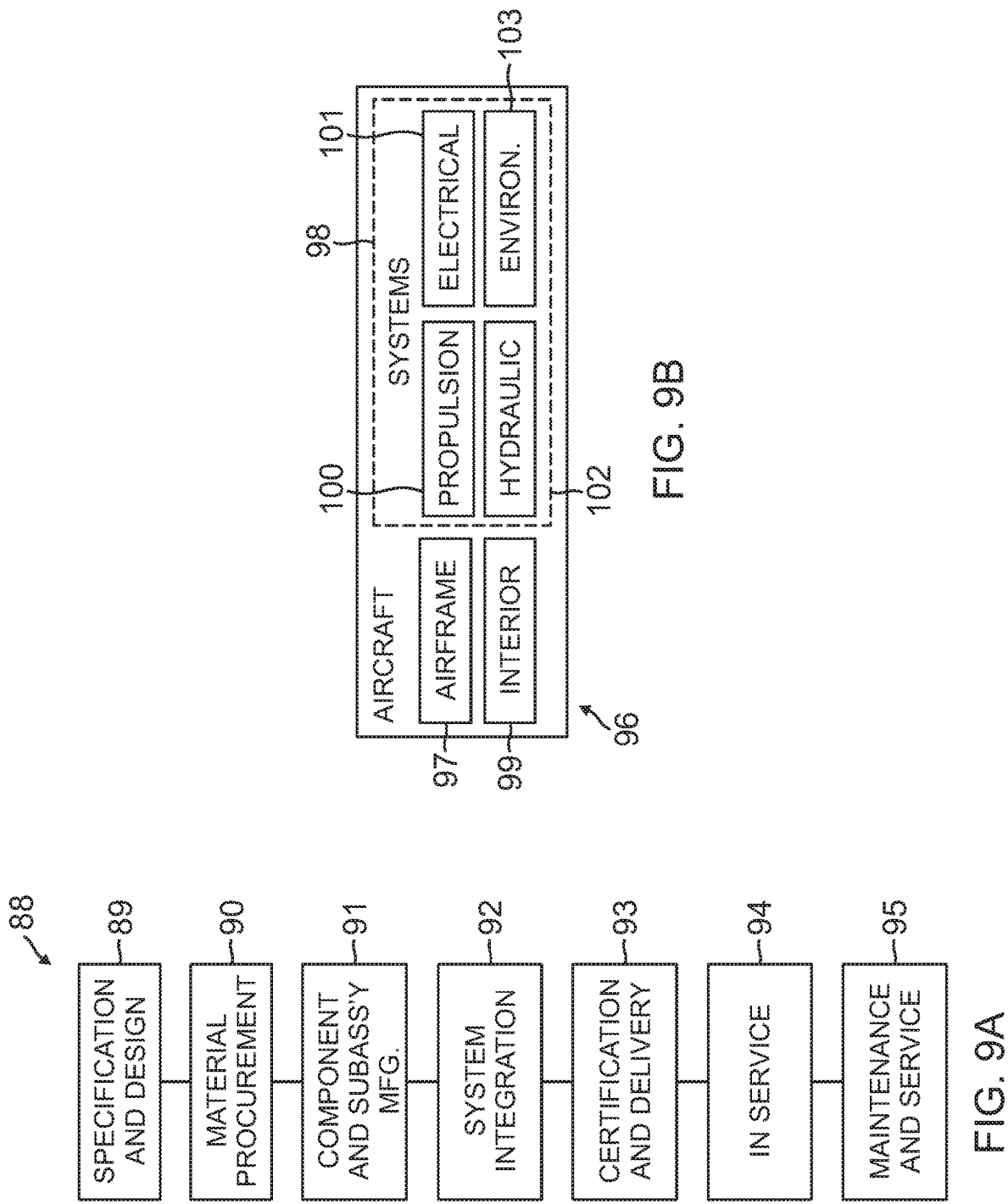

COMPOUND CONTOUR VACUUM TRACK FOR AUTOMATION OF FINAL ASSEMBLY FROM THE INTERIOR OF A FUSELAGE

CROSS REFERENCE TO RELATED APPLICATIONS

This application is continuation under 35 U.S.C. Section 120 of the following co-pending and commonly-assigned applications:

U.S. Utility application Ser. No. 15/365,426, filed on Nov. 30, 2016, by Kwok Tung Chan, Tanni Sisco, John Hartmann, Scott Tomchick and Frank Charles Mestemacher, entitled "COMPOUND CONTOUR VACUUM TRACK FOR AUTOMATION OF FINAL ASSEMBLY FROM THE INTERIOR OF A FUSELAGE," now U.S. Pat. No. 10,710,747, issued Jul. 14, 2020; and U.S. Utility application Ser. No. 15/365,441, filed on Nov. 30, 2016, by Kwok Tung Chan, Tanni Sisco, John Hartmann, Scott Tomchick, Frank Charles Mestemacher and Riley H. Hanson Smith, entitled "AUTOMATED FASTENING MACHINE USING A COMPOUND CONTOUR VACUUM TRACK FOR AUTOMATION OF FINAL ASSEMBLY FROM THE INTERIOR OF A FUSELAGE," now U.S. Pat. No. 10,723,484, issued Jul. 28, 2020;

both of which applications are incorporated by reference herein.

BACKGROUND INFORMATION

1. Field

The present invention relates to factory level automation, and in particular to a compound contour vacuum track for automation of final assembly from the interior of a fuselage.

2. Description of the Related Art

Factory level automation for aircraft assembly includes the automated drilling of holes and insertion of fasteners. For example, the joining of different sections of a fuselage may be automated in such a manner.

The fuselage may comprise a monocoque or semi-monocoque shell, wherein a series of hoop-wise frames in the shape of the fuselage cross sections are attached to longitudinal stringers that are covered with a skin of material. Most modern large aircraft use several large sections, which are then joined by fastening, riveting or bonding to form the complete fuselage.

In aircraft assembly, limited access to structures within the fuselage has posed a problem for automation. Currently, only the drilling of holes and the insertion of fasteners, such as lockbolts, has been automated, from the outside of the fuselage.

For example, an automated multi-axis drilling machine positioned outside the fuselage is currently used for the drilling of holes and the insertion of fasteners. The multi-axis drilling machine comprises a carriage with an end effector traveling on dual tracks. The end effector drills holes in fuselage and inserts fasteners into the holes.

Currently, manual fastening of collars onto the fasteners is performed on the inside of the fuselage. Specifically, the process inside the fuselage requires mechanics to install gap management tools and provide clamps for the drilling of holes and the insertion of fasteners. Mechanics also need to follow and align the multi-axis drilling machine positioned outside the fuselage, and manually install and swage collars from inside the fuselage.

However, manual fastening poses a number of issues, including ergonomic and safety considerations, product lead time and rework. On the other hand, the track used for the automated multi-axis drilling machine positioned outside the fuselage is not suitable for use inside the fuselage.

What is needed, then, are improved methods of factory automation, especially for final assembly inside a fuselage. The present invention satisfies this need.

SUMMARY

To overcome the limitations in the prior art described above, and to overcome other limitations that will become apparent upon reading and understanding the present specification, the present invention discloses a compound contour vacuum track, and an automated fastening machine using the track, for automation of final assembly inside an aircraft fuselage.

The devices and methods of the present invention are embodied in many ways, including, but not limited to, the following embodiments listed below.

1. A device or method for fastening a structure, comprising mounting a track interior to a structure in order to access a first surface of the structure, wherein the first surface has one or more holes through which fasteners are inserted. An automated fastening machine is mounted on the track to traverse the track while performing fastening functions, wherein the track allows the automated fastening machine to make contact with the first surface, such that the automated fastening machine aligns with the holes in the first surface, and the automated fastening machine installs the fasteners in the holes.

2. The device or method of embodiment 1, wherein the track is mounted at an angle to the first surface.

3. The device or method of embodiment 1, wherein the first surface is an inside surface of an aircraft fuselage.

4. The device or method of embodiment 1, wherein the track is shaped to match the first surface.

5. The device or method of embodiment 1, wherein the track is mounted so that its width is at an angle to the first surface.

6. The device or method of embodiment 1, wherein the track is at an angle of about 90 degrees to the first surface.

7. The device or method of embodiment 1, wherein the track is at an angle ranging from about 80 degrees to about 100 degrees to the first surface.

8. The device or method of embodiment 1, wherein the track is mounted on a second surface at an angle to the first surface.

9. The device or method of embodiment 8, wherein the second surface is an aft pressure bulkhead of an aircraft fuselage.

10. The device or method of embodiment 1, wherein the track is mounted directly on the first surface.

11. The device or method of embodiment 1, wherein the track is mounted along X-Axis and Z-Axis directions, the X-Axis direction comprises a lateral position, and the Z-Axis direction comprises a vertical position.

12. The device or method of embodiment 11, wherein the automated fastening machine is positioned along the track in at least the X-Axis and Z-Axis directions.

13. The device or method of embodiment 1, wherein the track is comprised of one or more sections.

14. The device or method of embodiment 13, wherein splices are used for connecting between the sections.

15. The device or method of embodiment 1, wherein the track is mounted interior to the structure using one or more removable attachment devices.

16. The device or method of embodiment of claim 1, wherein the track includes a drive rack for engaging and moving the automated fastening machine along the track.

DRAWINGS

Referring now to the drawings in which like names and reference numbers represent corresponding parts throughout:

Figure 3A:
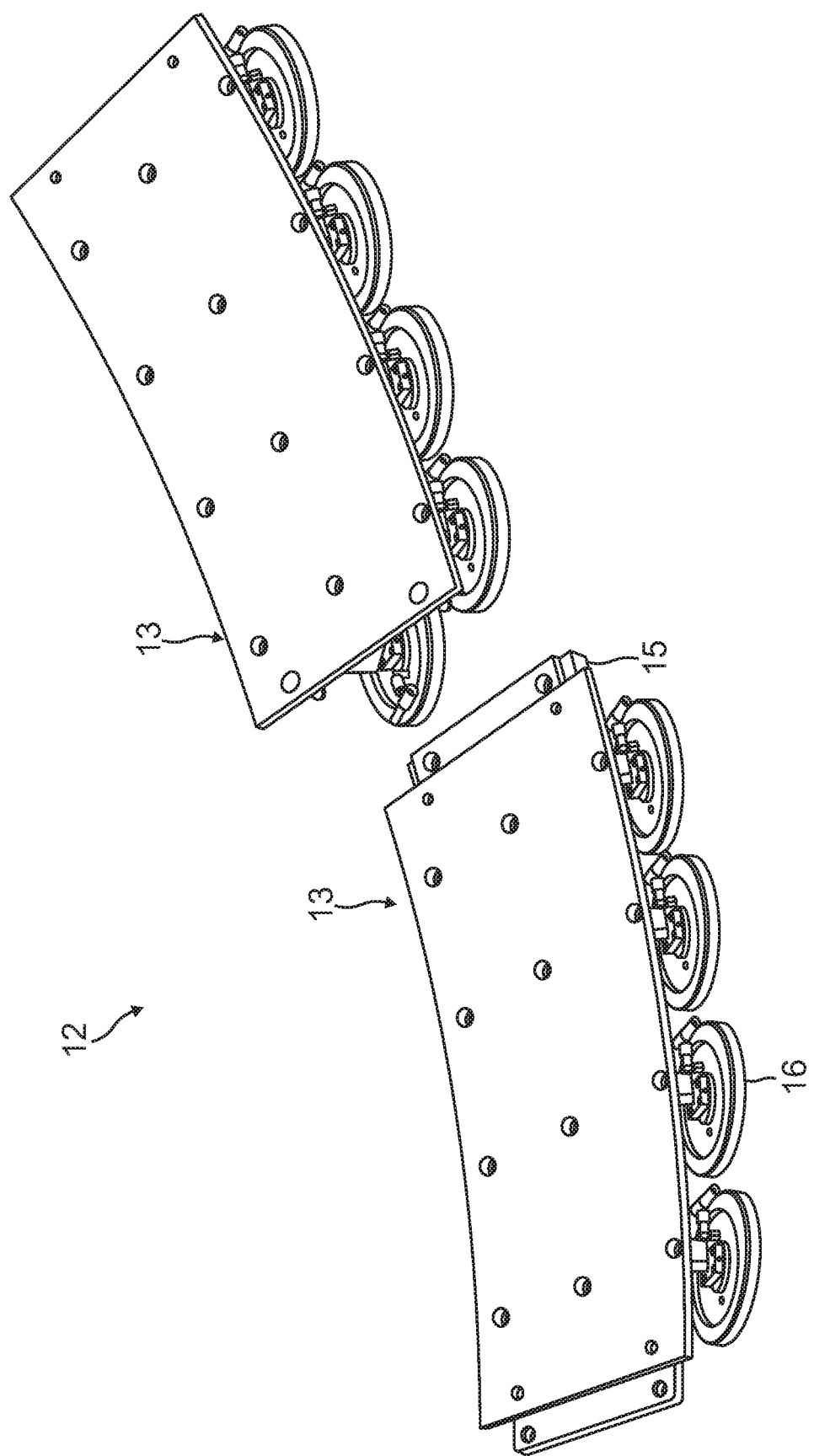
Figure 3B:
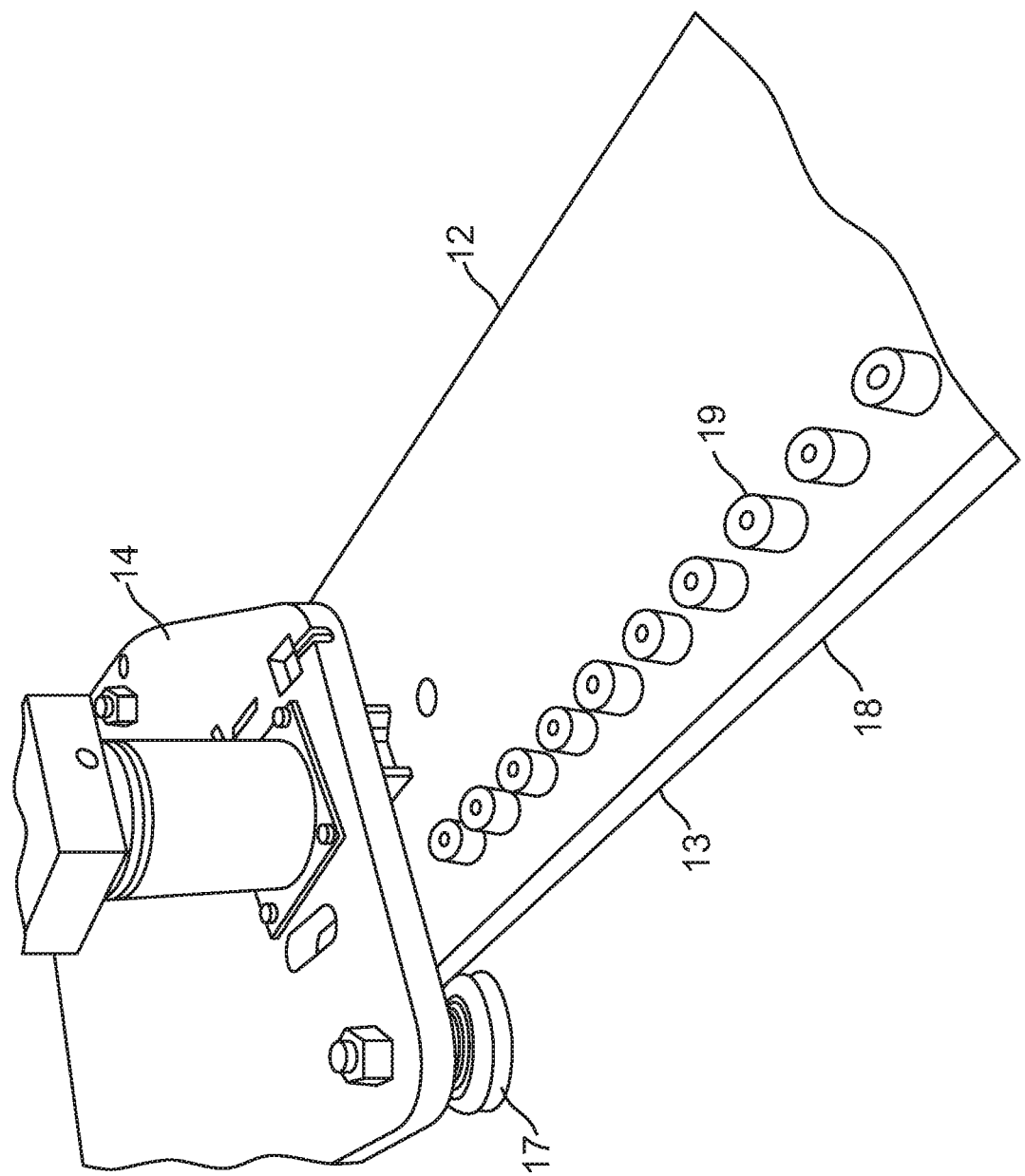

FIGS. 3A and 3B further illustrate a compound contour vacuum track that is designed to follow the complex contour of the inside of the fuselage.

FIGS. 4A-4H further illustrate the automated fastening machine, according to one embodiment.

Figure 5A:
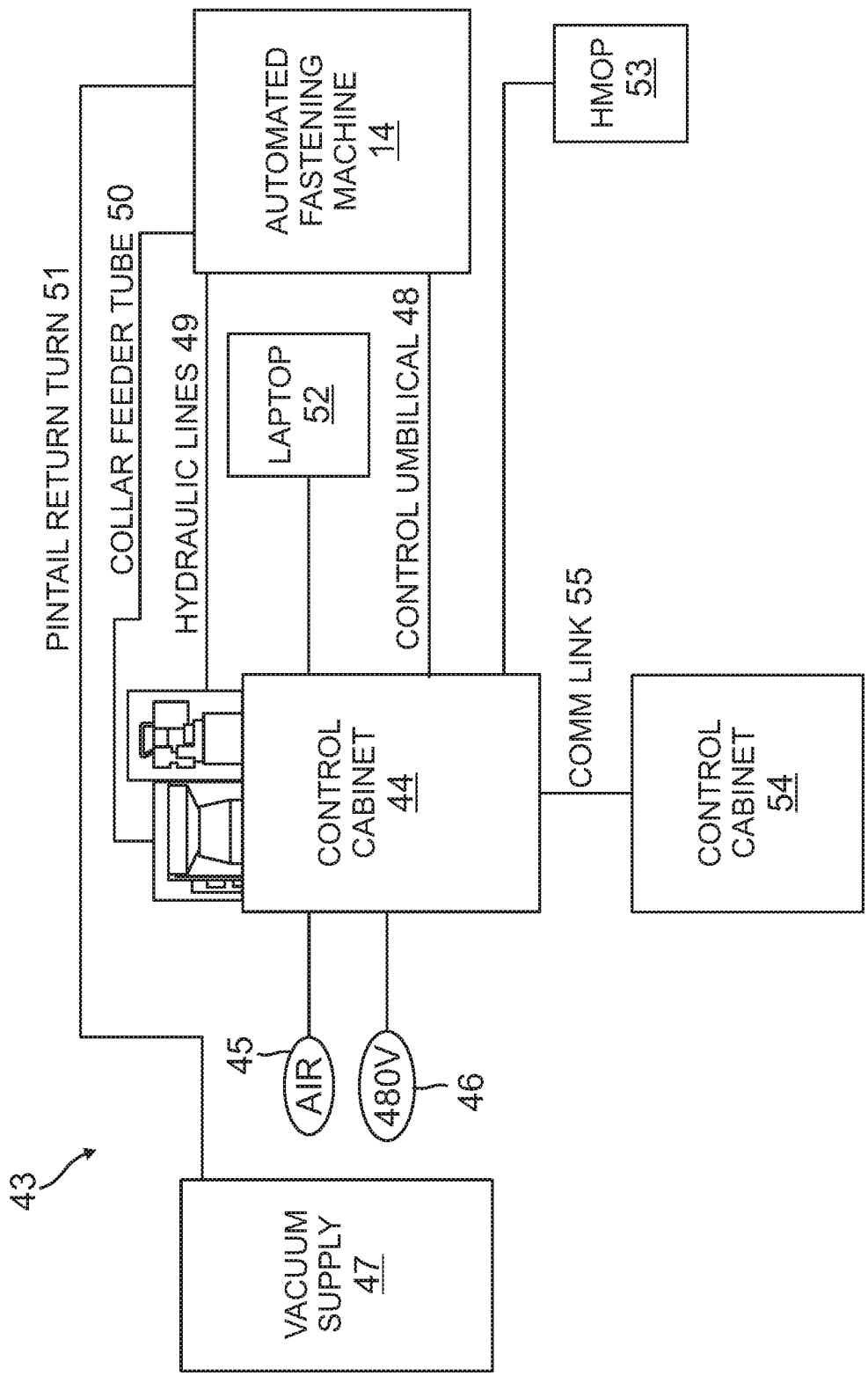
Figure 5B:
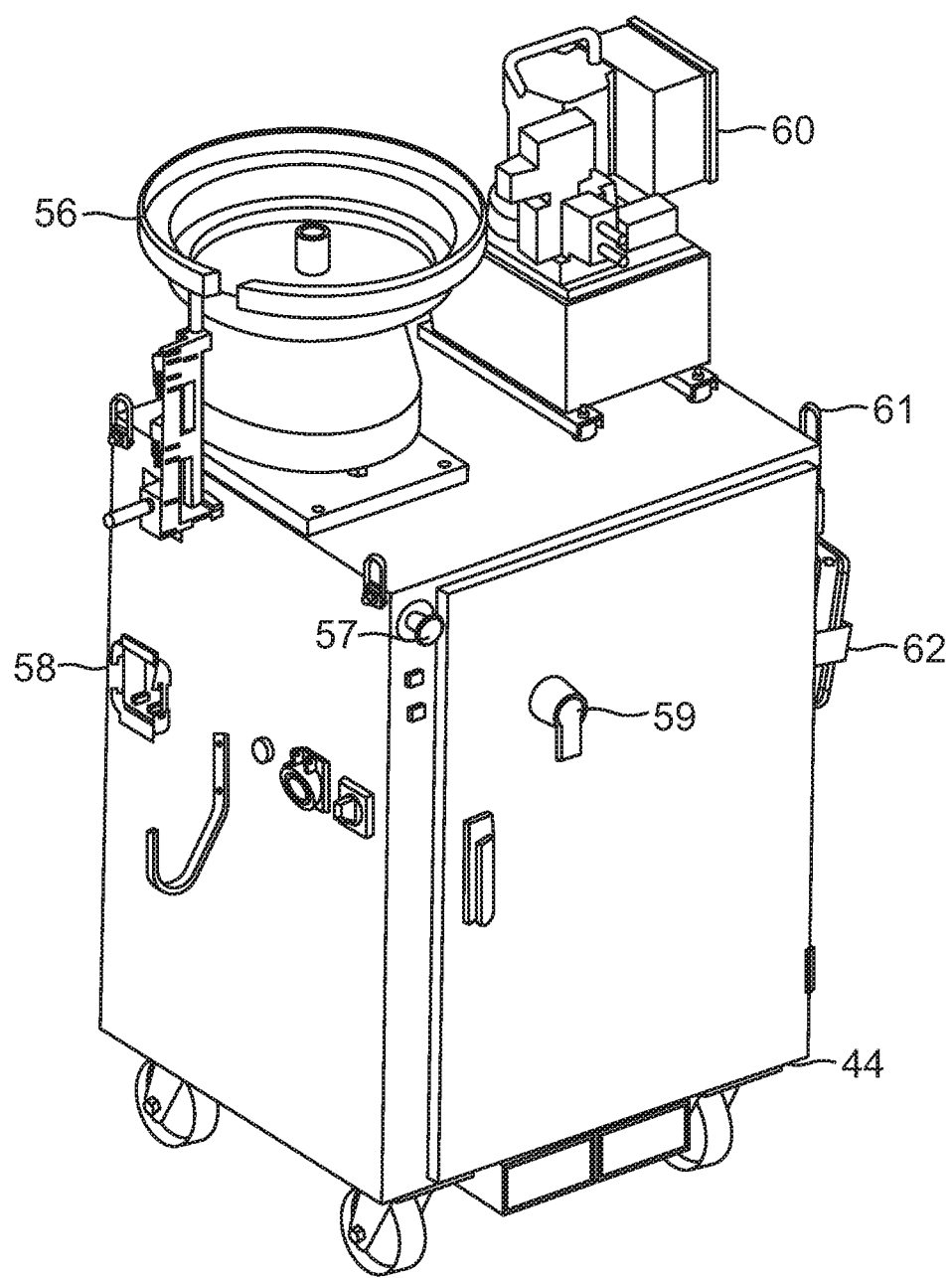

FIG. 5A provides a system overview of a control system, according to one embodiment, and FIG. 5B further illustrates a control cabinet, according to one embodiment.

Figure 6A:
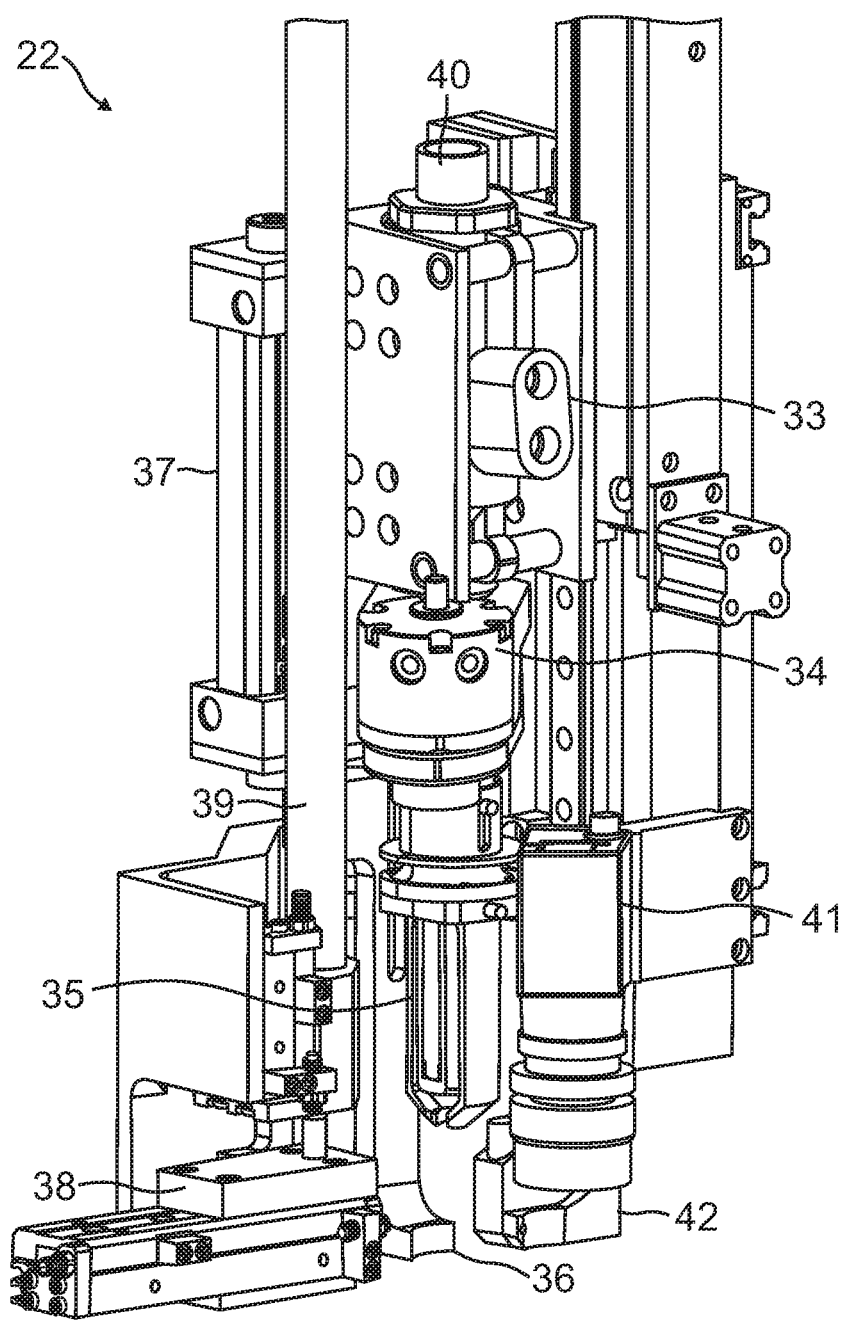
Figure 6B:
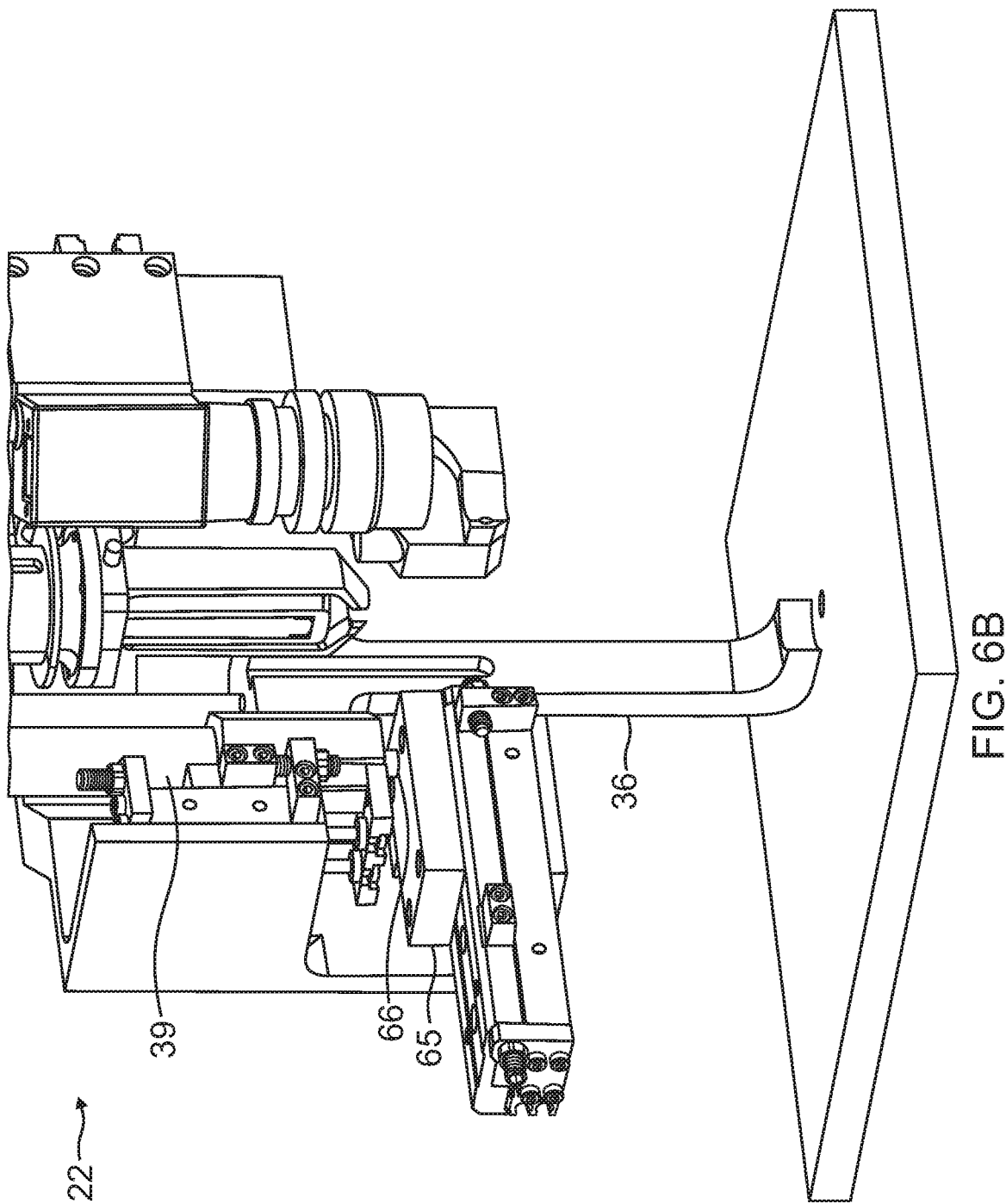
Figure 6E:
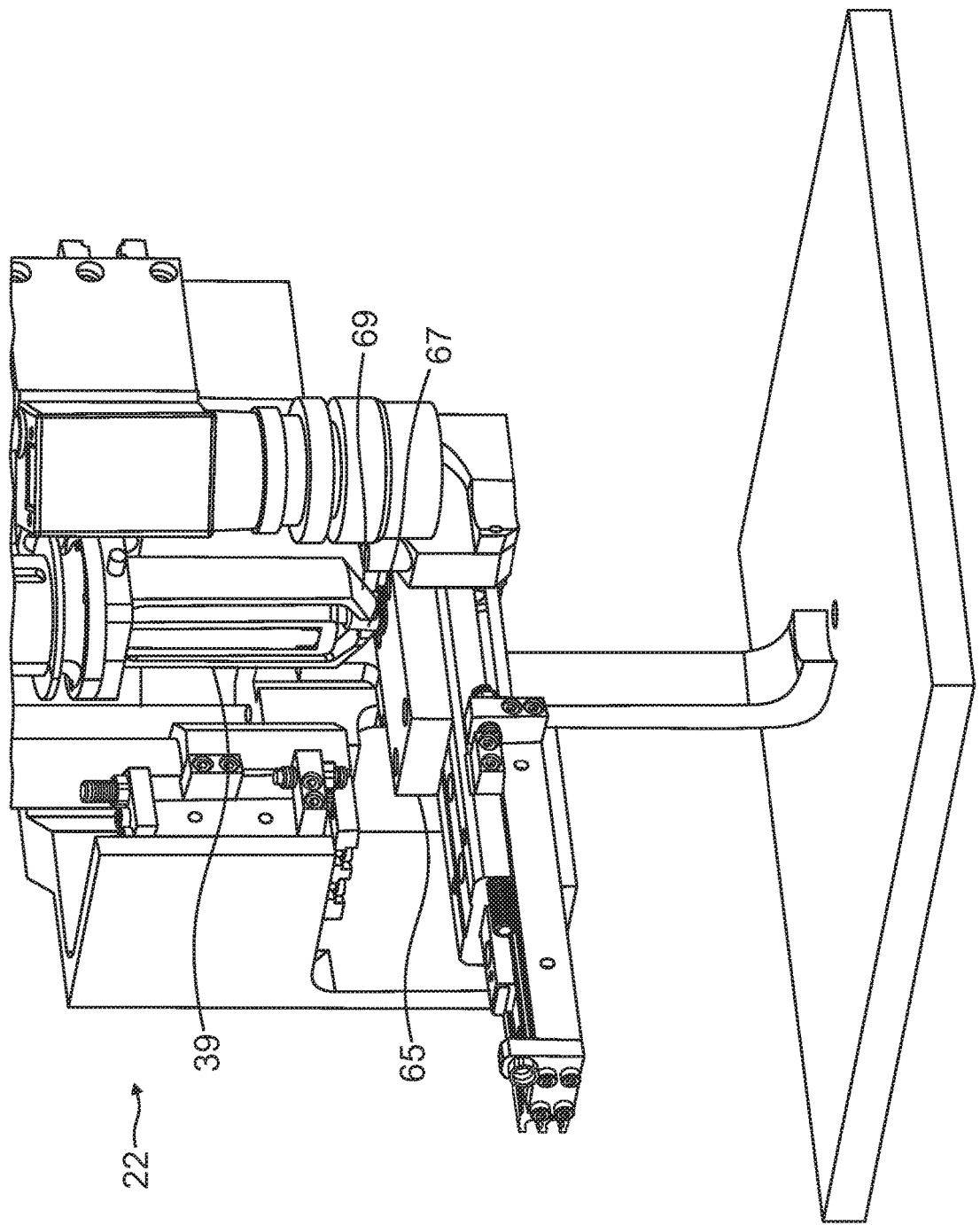
Figure 6F:
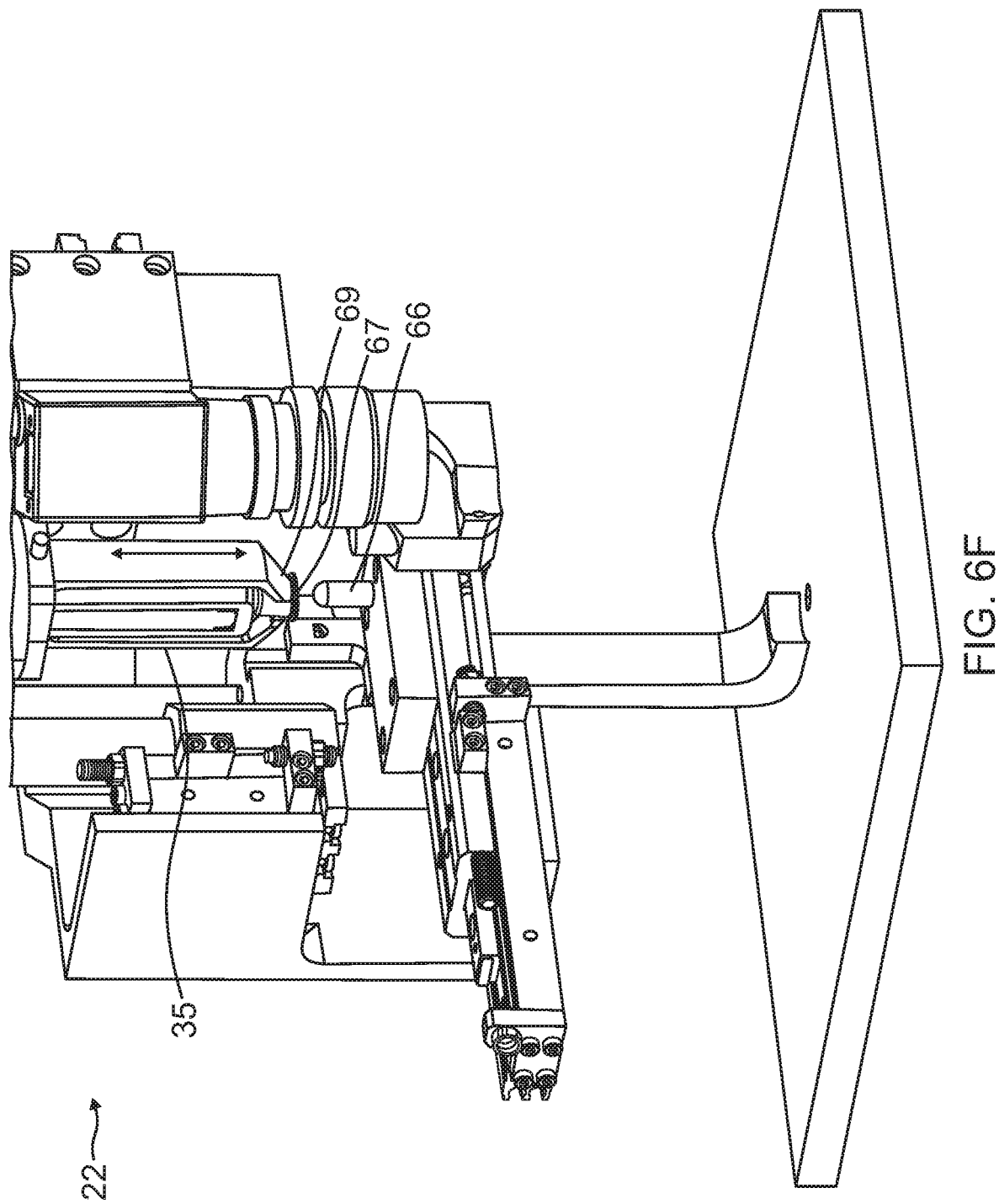
Figure 6G:
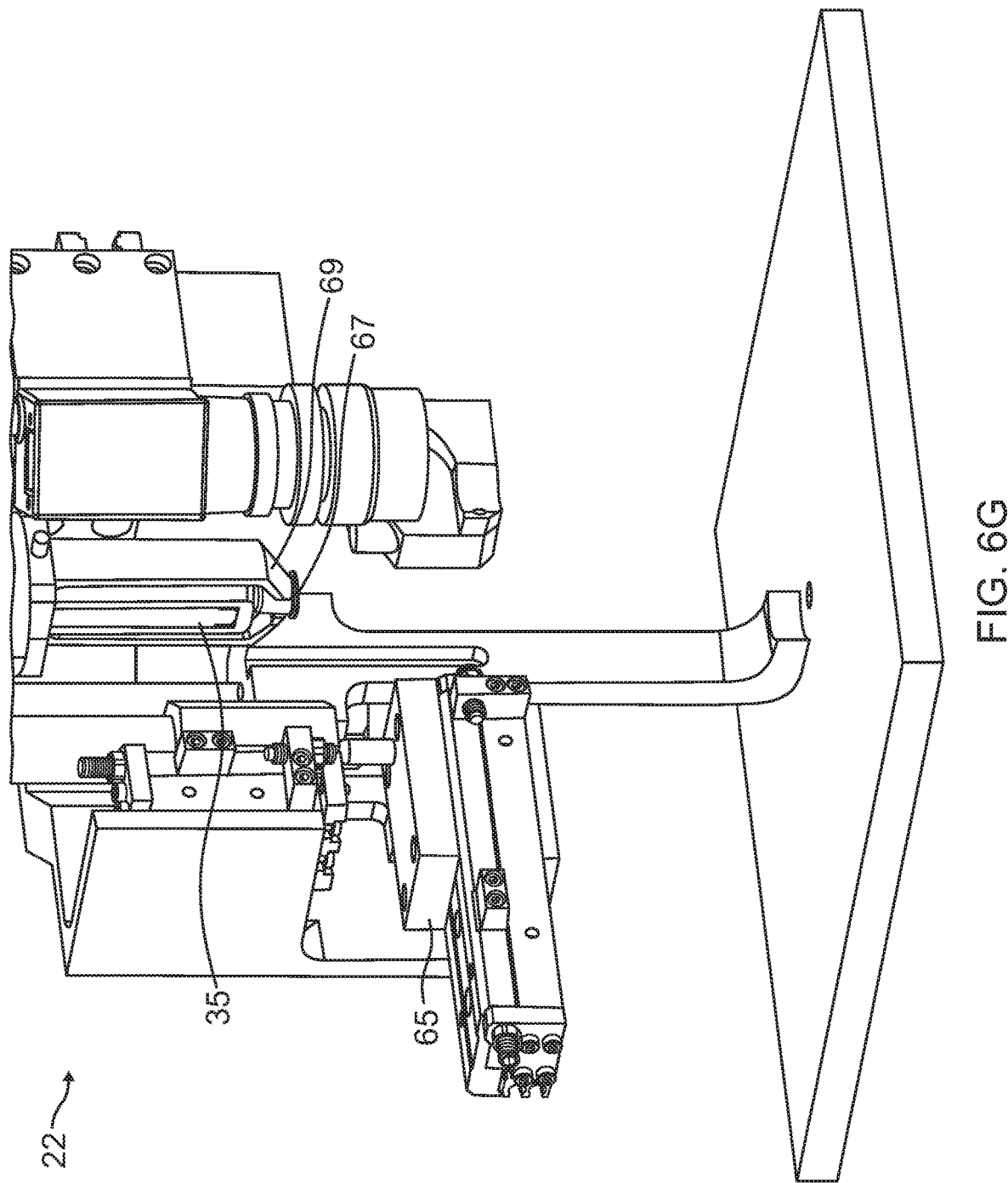
Figure 6H:
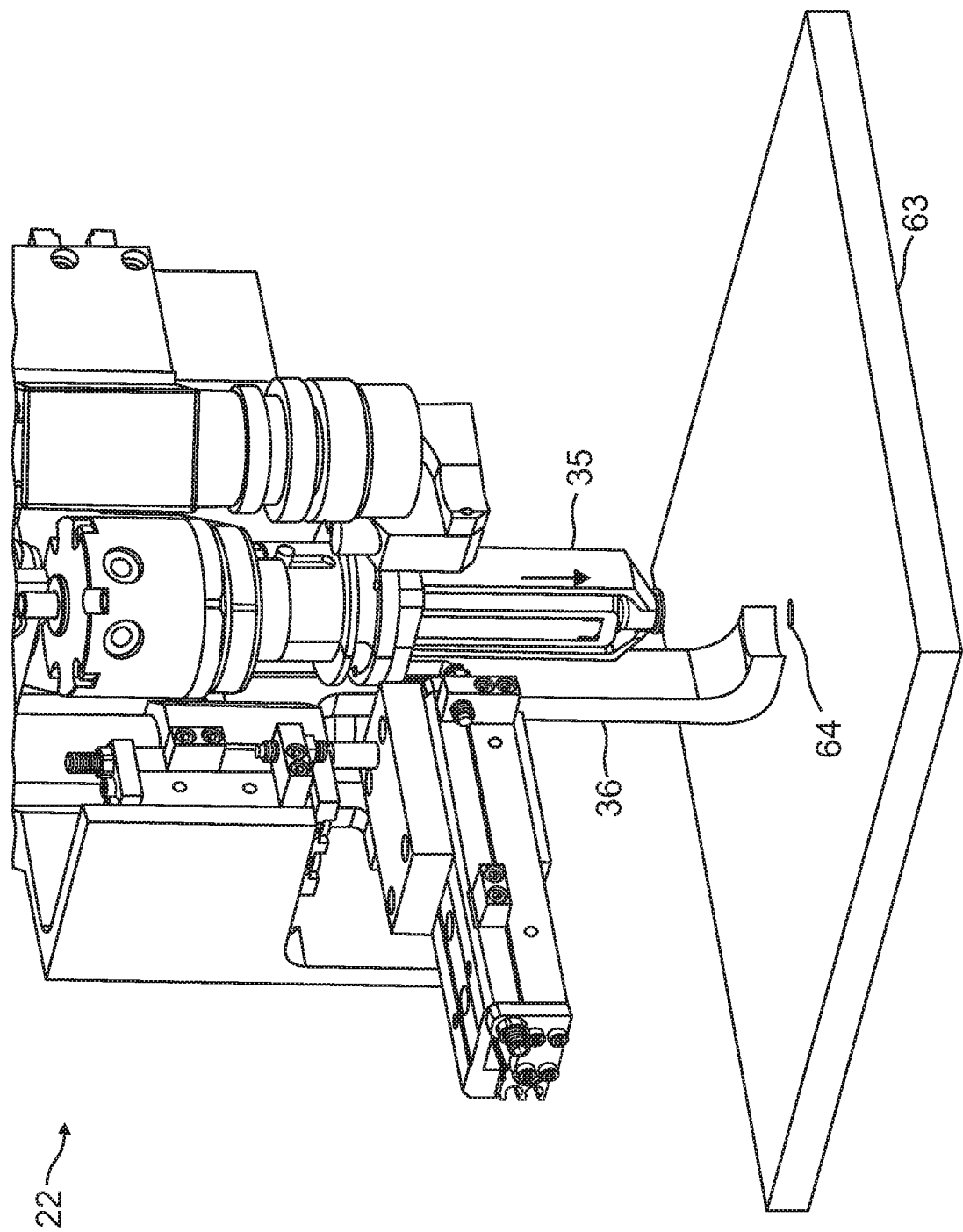
Figure 6I:
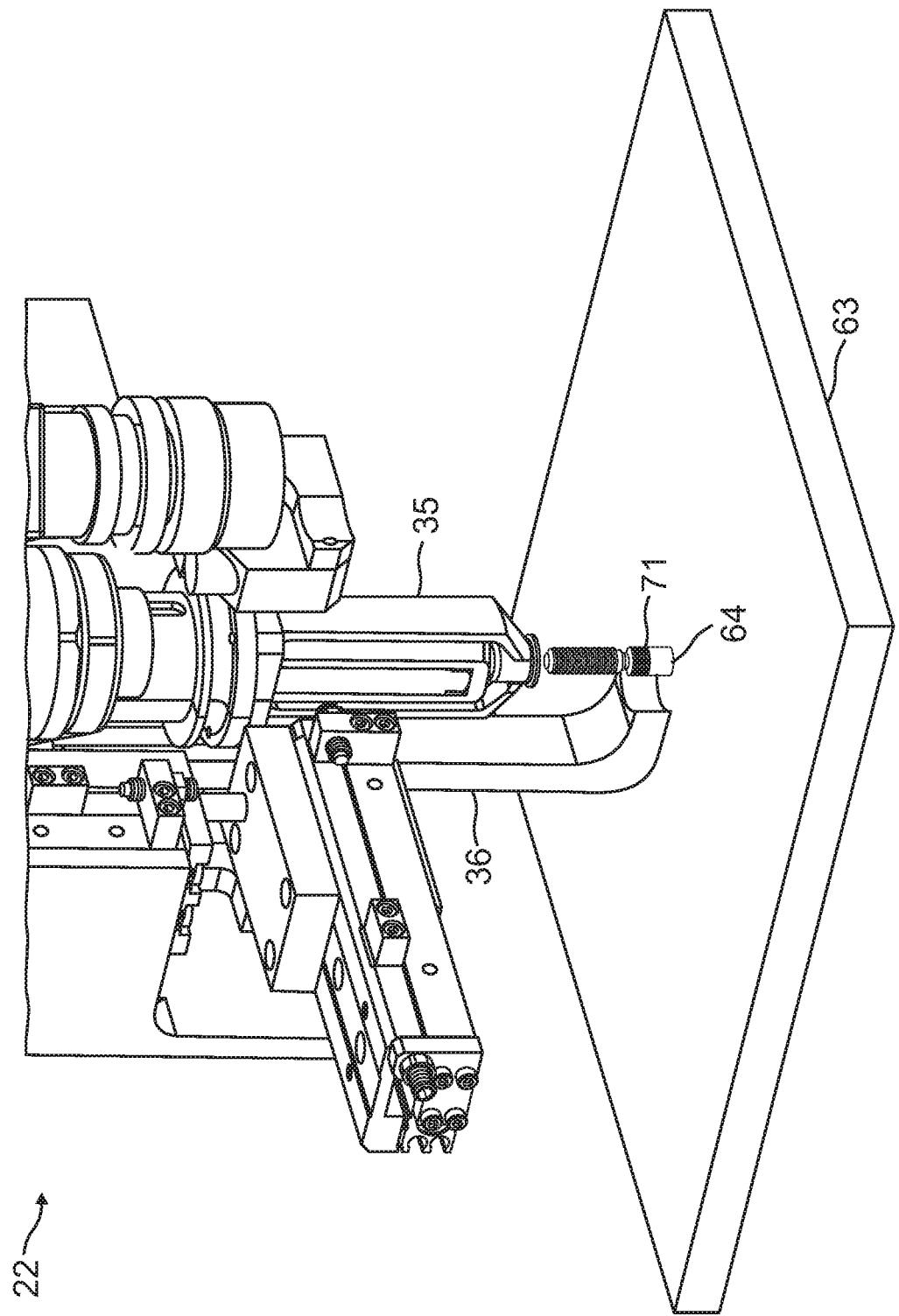
Figure 6J:
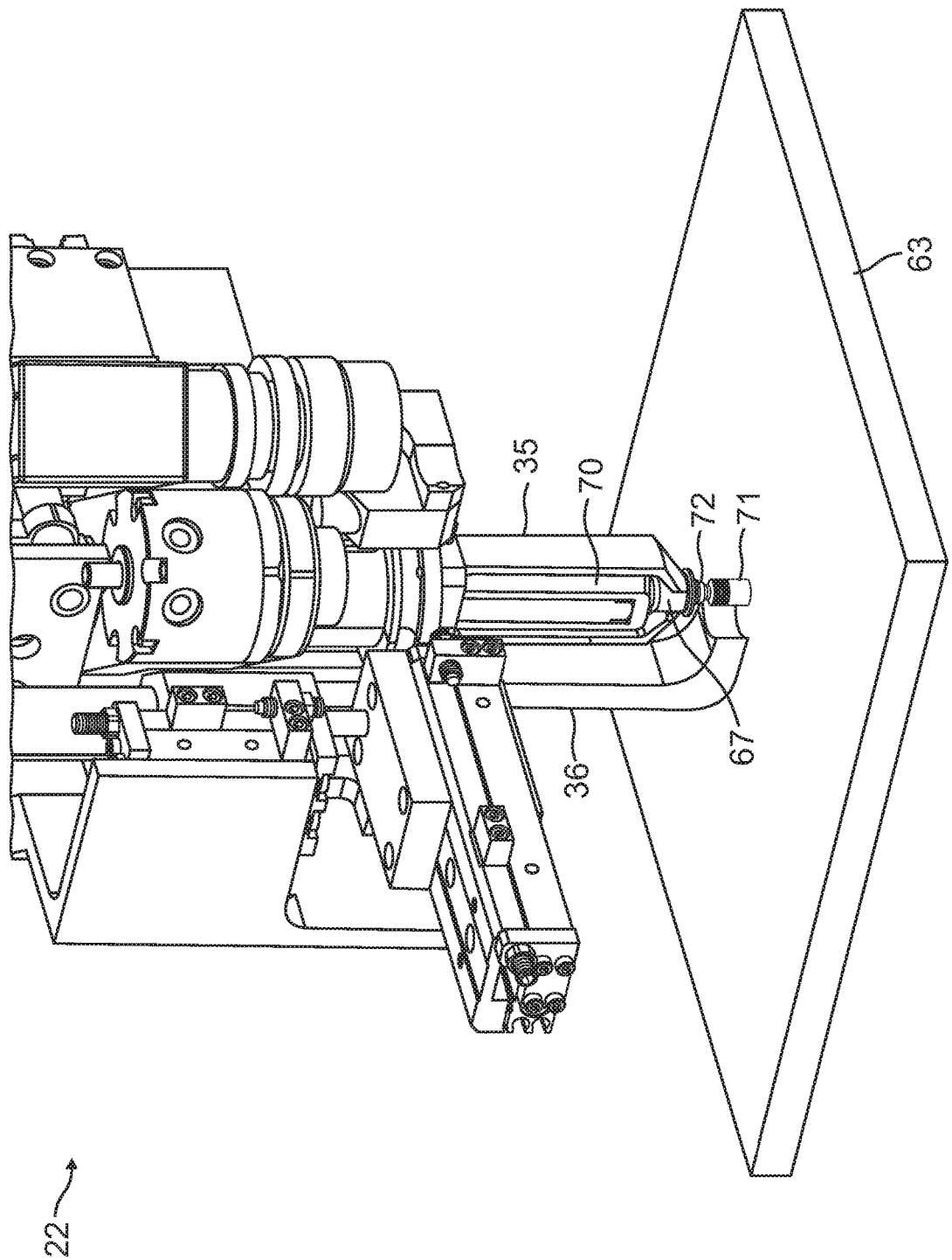
Figure 6K:
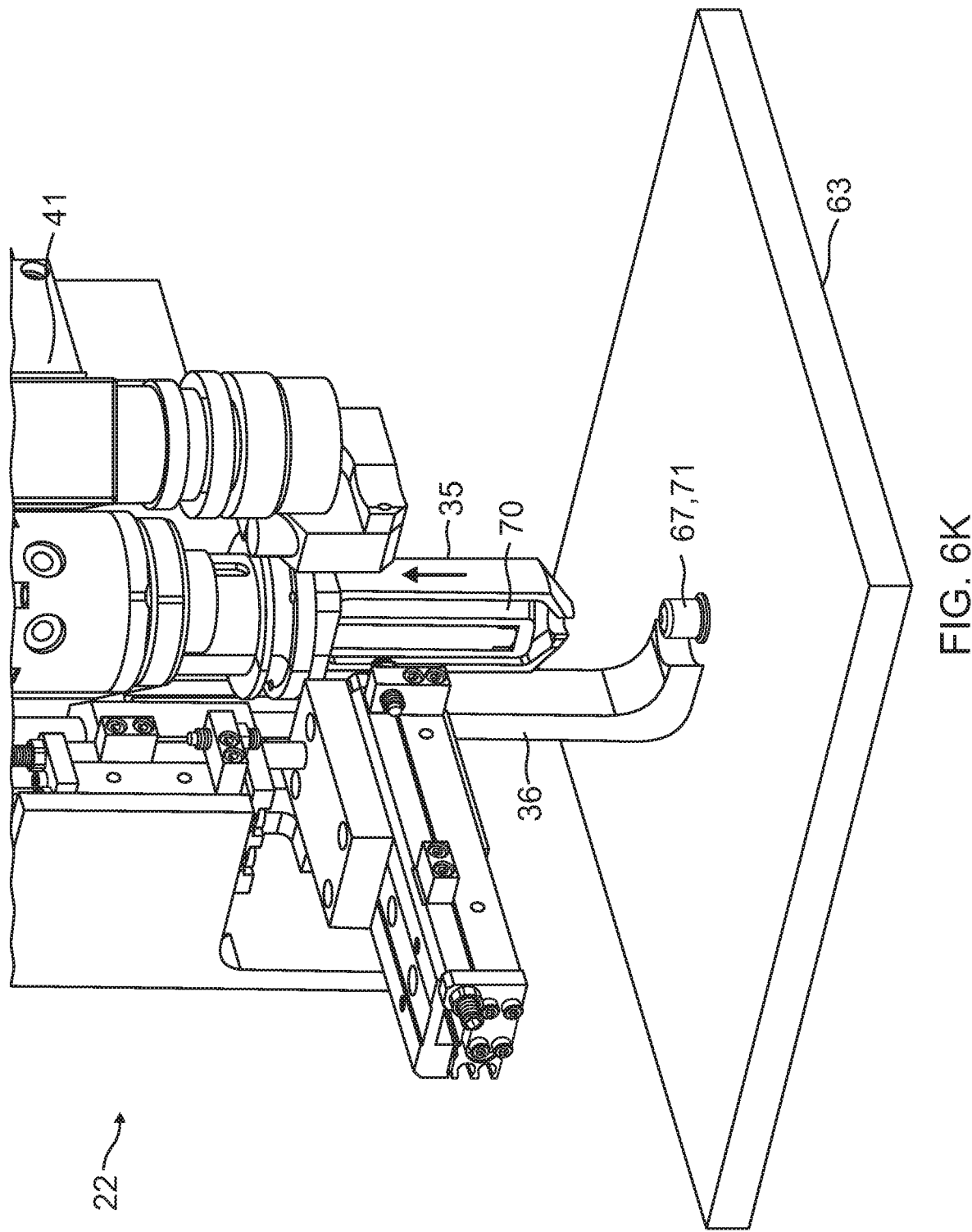
Figure 7:
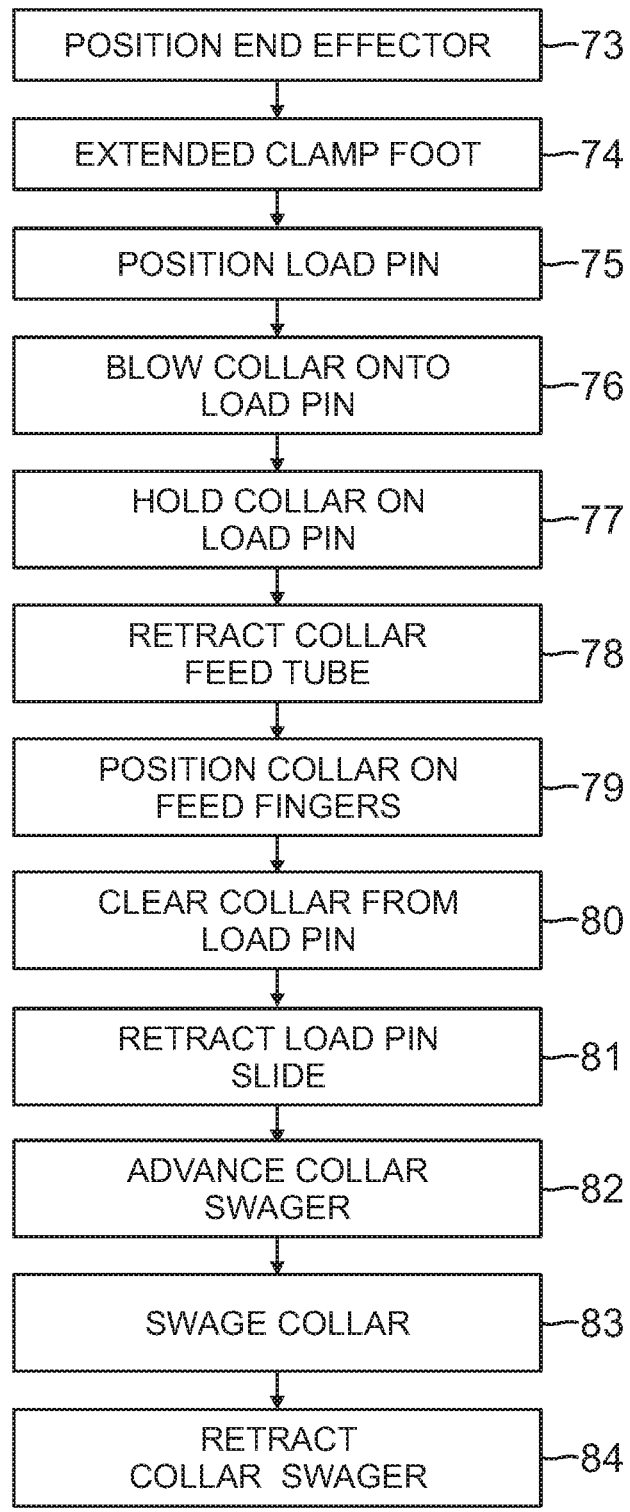

FIGS. 6A-6K illustrate a sequence of steps performed by the automated fastening machine as directed by the control system, according to one embodiment:

FIG. 7 is a flowchart that further illustrates the sequence of steps performed in FIGS. 6A-6K.

Figure 8A:
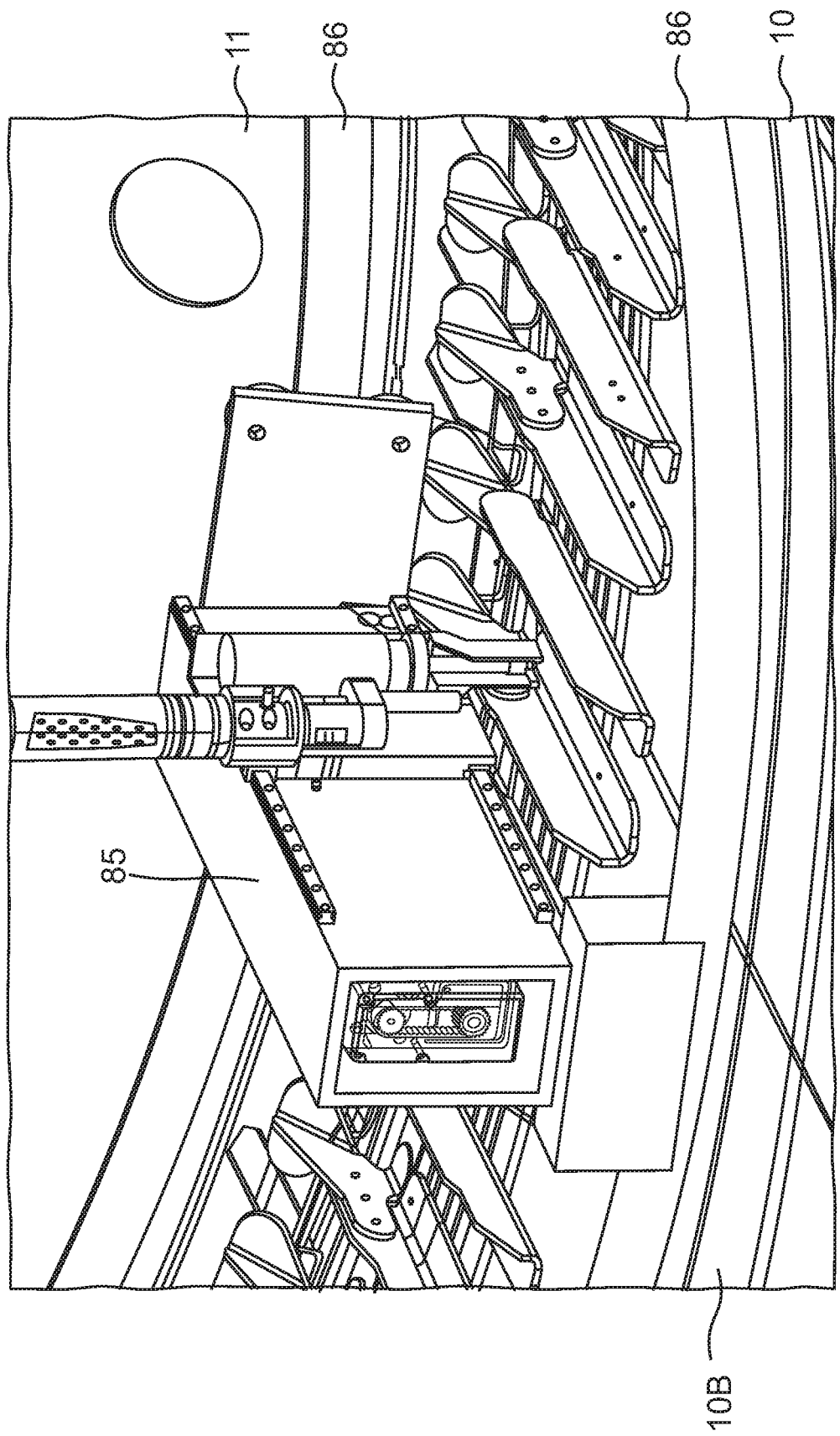
Figure 8B:
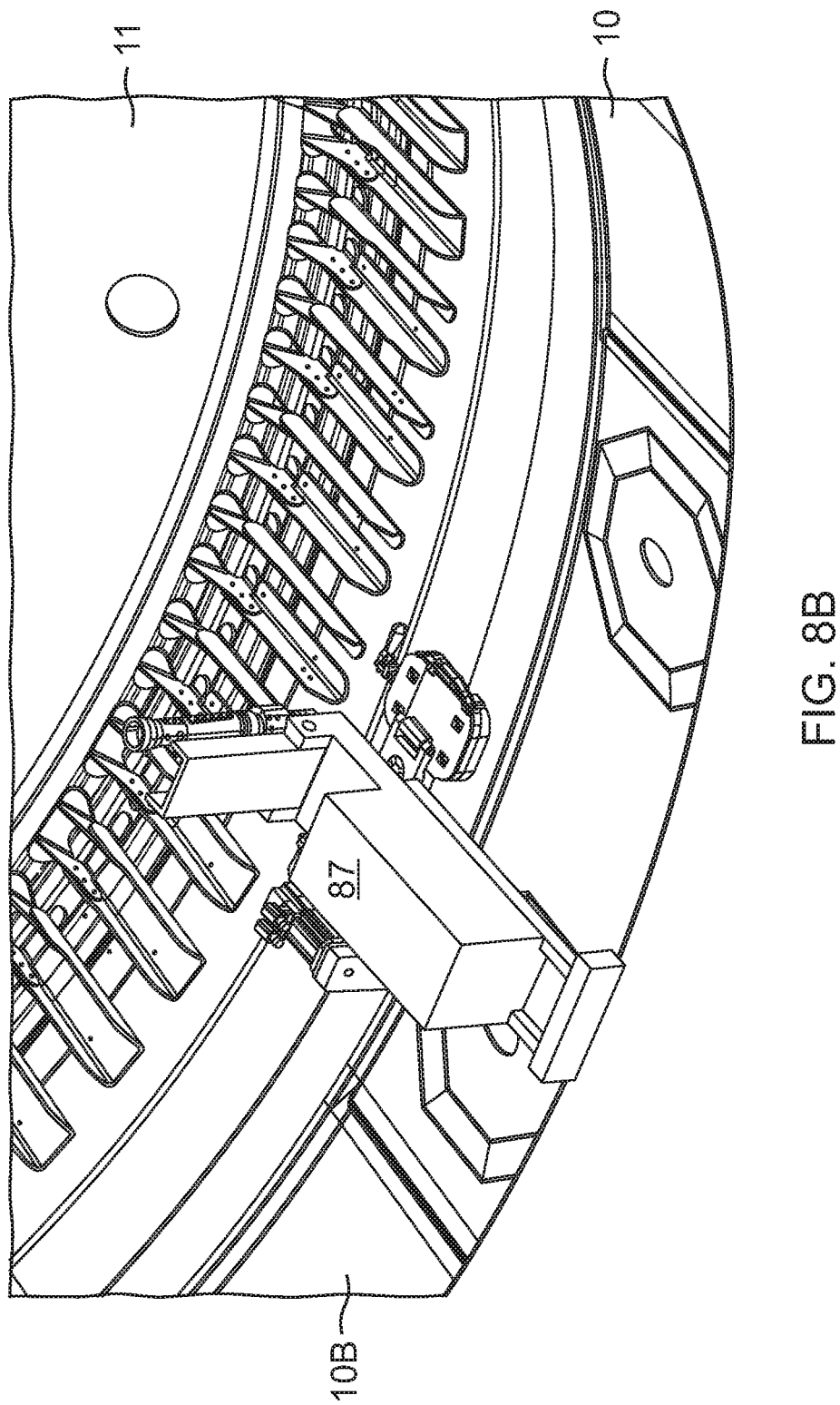

FIG. 8A illustrates a Bridge-style automated fastening machine; and FIG. 8B illustrates a cantilevered automated fastening machine.

FIG. 9A is a flow diagram of aircraft production and service methodology, according to one embodiment.

FIG. 9B is a block diagram of an aircraft, according to one embodiment.

DETAILED DESCRIPTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
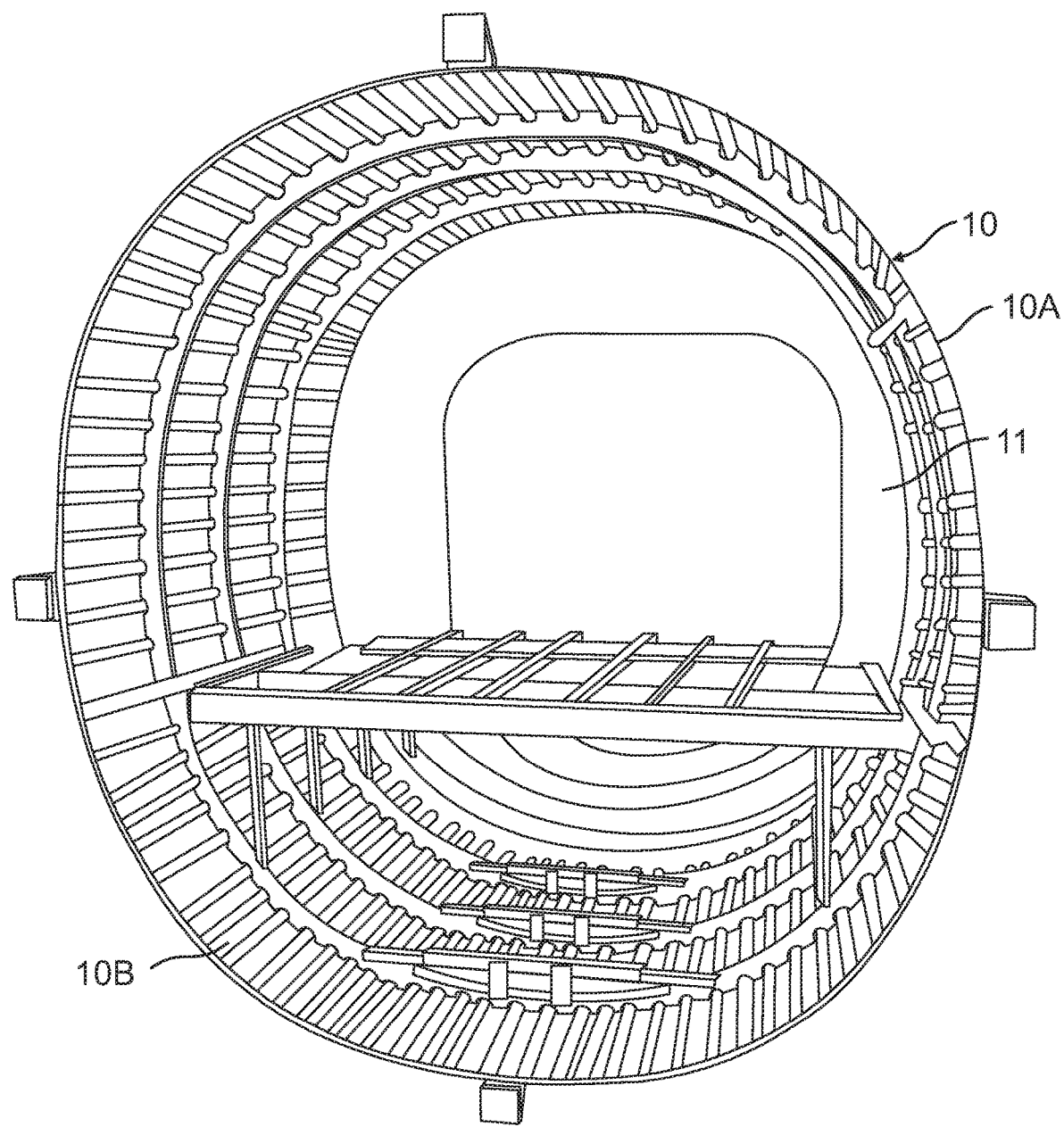
FIG. 1 illustrates two sections of an aircraft fuselage positioned for being joined.

FIG. 1 illustrates two sections of an aircraft fuselage 10 positioned for being joined. In one embodiment, the two sections are joined at or adjacent to an aft pressure bulkhead (APB) 11, although other sections could be joined at other locations as well. The aft pressure bulkhead 11 is an airtight bulkhead located between the cabin and the tail of the aircraft whose purpose is to seal the rear of the plane and thus maintain cabin pressure for the aircraft. In aircraft assembly, limited access to structures adjacent to the aft pressure bulkhead 11 within the fuselage 10 has posed a problem for automation.

Currently, only the drilling of holes and the insertion of fasteners, such as lockbolts, has been automated, from an outside surface 10A of the fuselage 10. As noted above, an automated multi-axis drilling machine positioned on the outside surface 10A of the fuselage 10 is currently used for the drilling of holes and the insertion of fasteners. The multi-axis drilling machine comprises a carriage with an end effector traveling on dual tracks, wherein the end effector drills holes in fuselage 10 and inserts fasteners into the holes. However, manual fastening of collars onto the fasteners is currently performed on an inside surface 10B of the fuselage 10, but manual fastening poses a number of issues. This disclosure overcomes these issues by describing an automated system of fastening for final assembly from inside the fuselage 10.

Figure 2A:
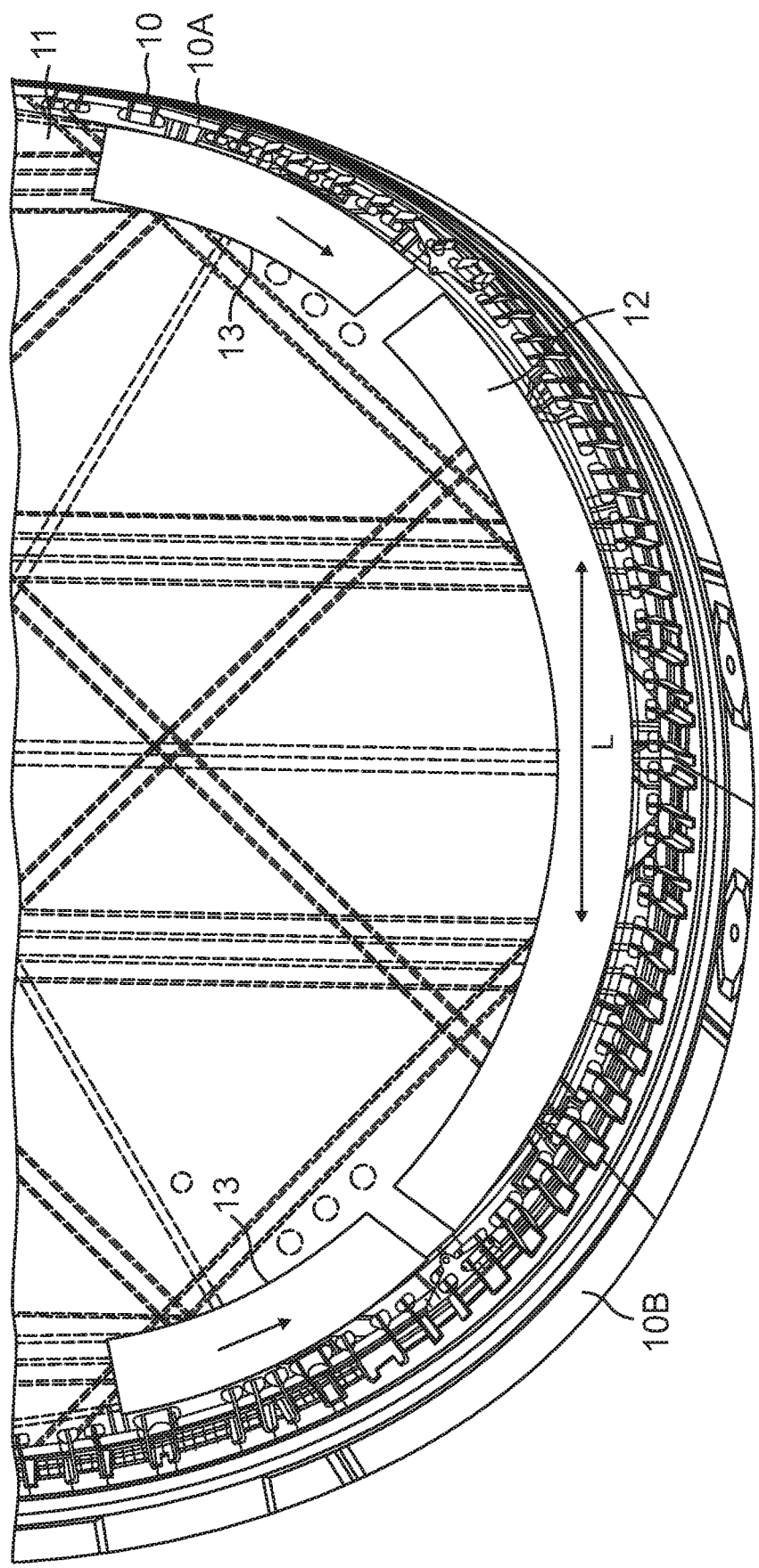
FIGS. 2A, 2B and 2C illustrate a system for fastening a structure using a compound contour vacuum track and an automated fastening machine inside of an aircraft fuselage.
Figure 2B:
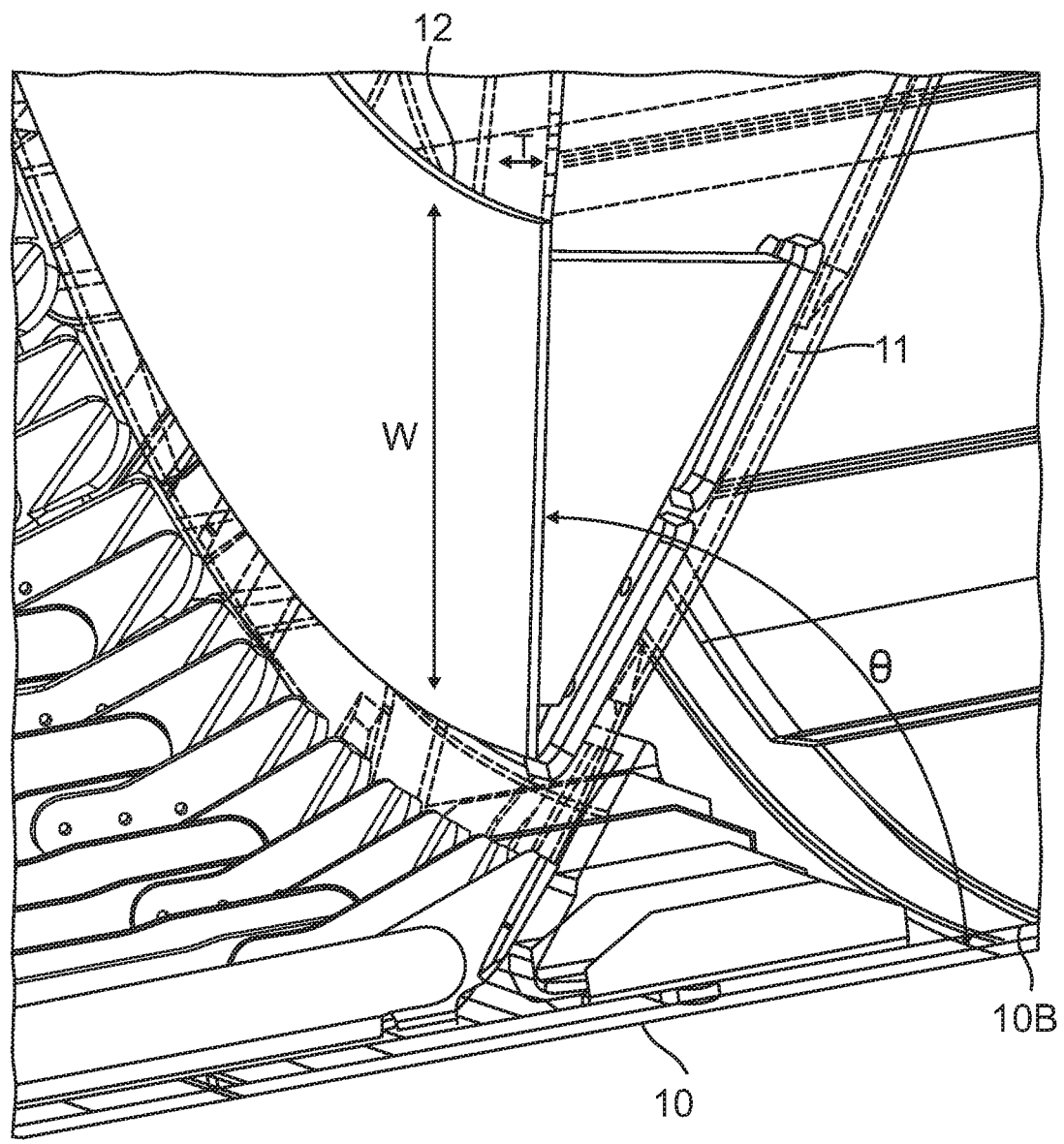
Figure 2C:
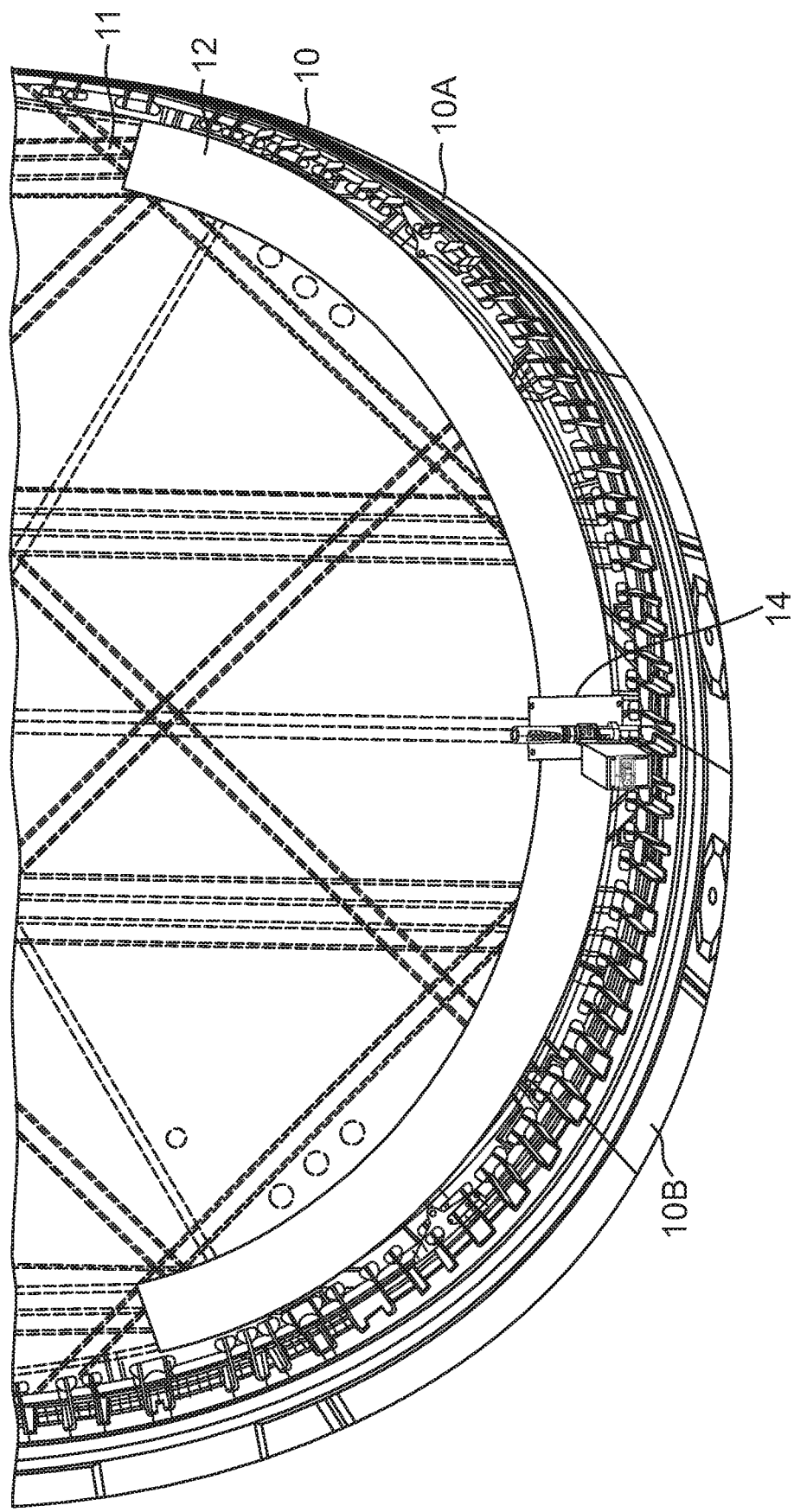

FIGS. 2A, 2B and 2C illustrate one embodiment of a system for fastening a structure comprised of a compound contour vacuum track 12 positioned on an inside surface 10B of the fuselage 10.

As shown in FIG. 2A, the track 12 is comprised of one or more sections 13 that, when assembled, indexed, aligned and mounted onto the fuselage 10, are shaped to fit the inside surface 10B of the fuselage 10, also referred to herein as a first surface 10B, although other surfaces may be used as well. The sections 13 of the track 12 are aligned and mounted along X-Axis and Z-Axis directions of the fuselage 10, wherein the X-Axis direction comprises a lateral position within the fuselage 10 and the Z-Axis direction comprises a vertical position within the fuselage 10. The arrows on the sections 13 indicate a deployment sequencing of the sections 13, which involves positioning and mounting a center section 13 first, and then positioning and mounting adjacent sections 13 on opposite ends of the track 12.

As shown in FIGS. 2A and 2B, the track 12 has a length (L), width (W) and thickness (T), and the track 12 is mounted so that its width W is at an angle (θ) to the first surface 10B. Specifically, the width W of the track 12 is not laid flush on the first surface 10B. Instead, the width W of the track 12 is cantilevered upward at an angle θ relative to the first surface 10B. Preferably, the track 12 is cantilevered upward at an angle θ greater than about 0 degrees to the first surface 10B, more preferably at an angle θ of about 90 degrees, i.e., substantially perpendicular, to the first surface 10B, and most preferably at an angle θ ranging from about 80 degrees to about 100 degrees, i.e., within about ±10 degrees of substantially perpendicular, to the first surface 10B.

To position the track 12 in this manner, the track 12 is mounted on the aft pressure bulkhead 11, also referred to herein as a second surface 11, although other surfaces may be used as well. In this embodiment, the track 12 is cantilevered from the second surface 11 so that the track 12 is cantilevered upward at an angle θ to the first surface 10B. However, in other embodiments, the track 12 is mounted directly on the first surface 10B, i.e., the inside surface 10B of the fuselage 10 itself.

As shown in FIG. 2C, an automated fastening machine 14 is mounted on the track 12 and travels along the track 12 to perform the fastening functions and steps, wherein the track 12 allows the automated fastening machine 14 to make contact with the first surface 10B. At any instant, the automated fastening machine 14 is positioned along the track 12 in at least the X-Axis and Z-Axis directions.

FIG. 3A further illustrates the track 12, which is a compound contour track 12, although it may conform to other shapes as well. The track 12 is modular and is segmented into a plurality of sections 13, wherein each section 13 is aluminum, about 2 feet in length and about 28 lbs. in weight. Splices 15 are used for connecting between the sections 13. The track 12 is mounted interior to the fuselage 10 on the aft pressure bulkhead 11 using one or more removable attachment devices 16, which in one embodiment comprise vacuum suction cups 16.

FIG. 3B is another view of a section 13 of the track 12 with the automated fastening machine 14 attached, according to one embodiment. The wheels 17 of the automated fastening machine 14 are dual-vee wheels 17 that sandwich the track 12, wherein the track 12 includes edge guides 18 for engaging the wheels 17. The track 12 also includes a drive rack 19 for engaging and moving the automated fastening machine 14 along the track 12, wherein the drive rack 19 is a roller rack that is integrated into the track 12.

FIGS. 4A-4H further illustrate the automated fastening machine 14, according to one embodiment.

Figure 4A:
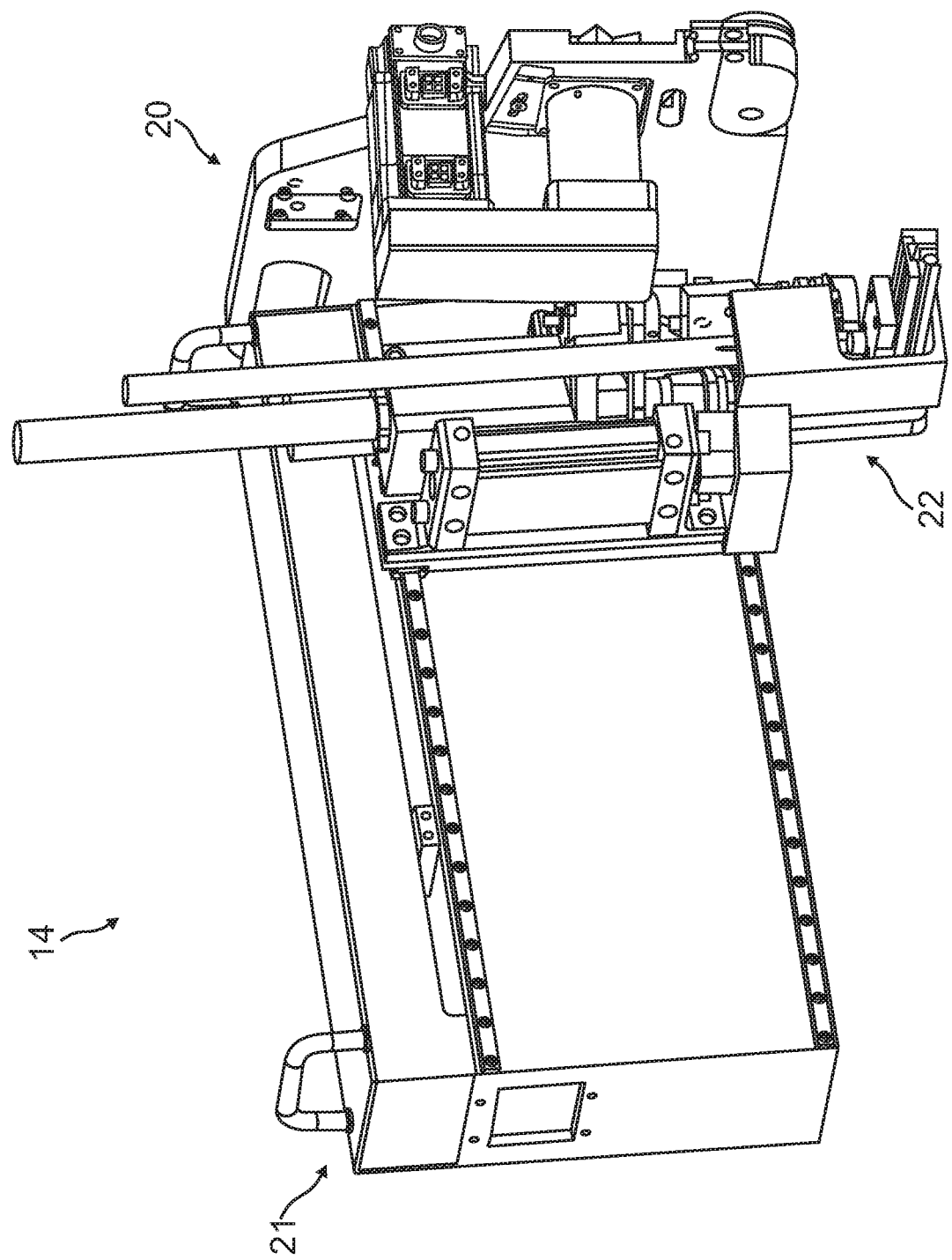

FIG. 4A shows the major components of the automated fastening machine 14, which include an X-Axis Carriage 20, Y-Axis Arm 21 and End Effector 22, wherein the Y-Axis Arm 21 is mounted on the X-Axis Carriage 20 and the End Effector 22 is mounted on the Y-Axis Arm 21. The X-Axis Carriage 20 is attached to the track 12 for positioning the Y-Axis Arm 21 and End Effector 22, the Y-Axis Arm 21 is attached to the X-Axis Carriage 20 for positioning the End Effector 22, and the End Effector 22 installs the fasteners into the holes of the inside surface 10B, e.g., it installs collars or nuts on fasteners inserted into the holes from the outside surface 10A, as described in more detail below in conjunction with FIGS. 6A-6K and 7.

Figure 4B:
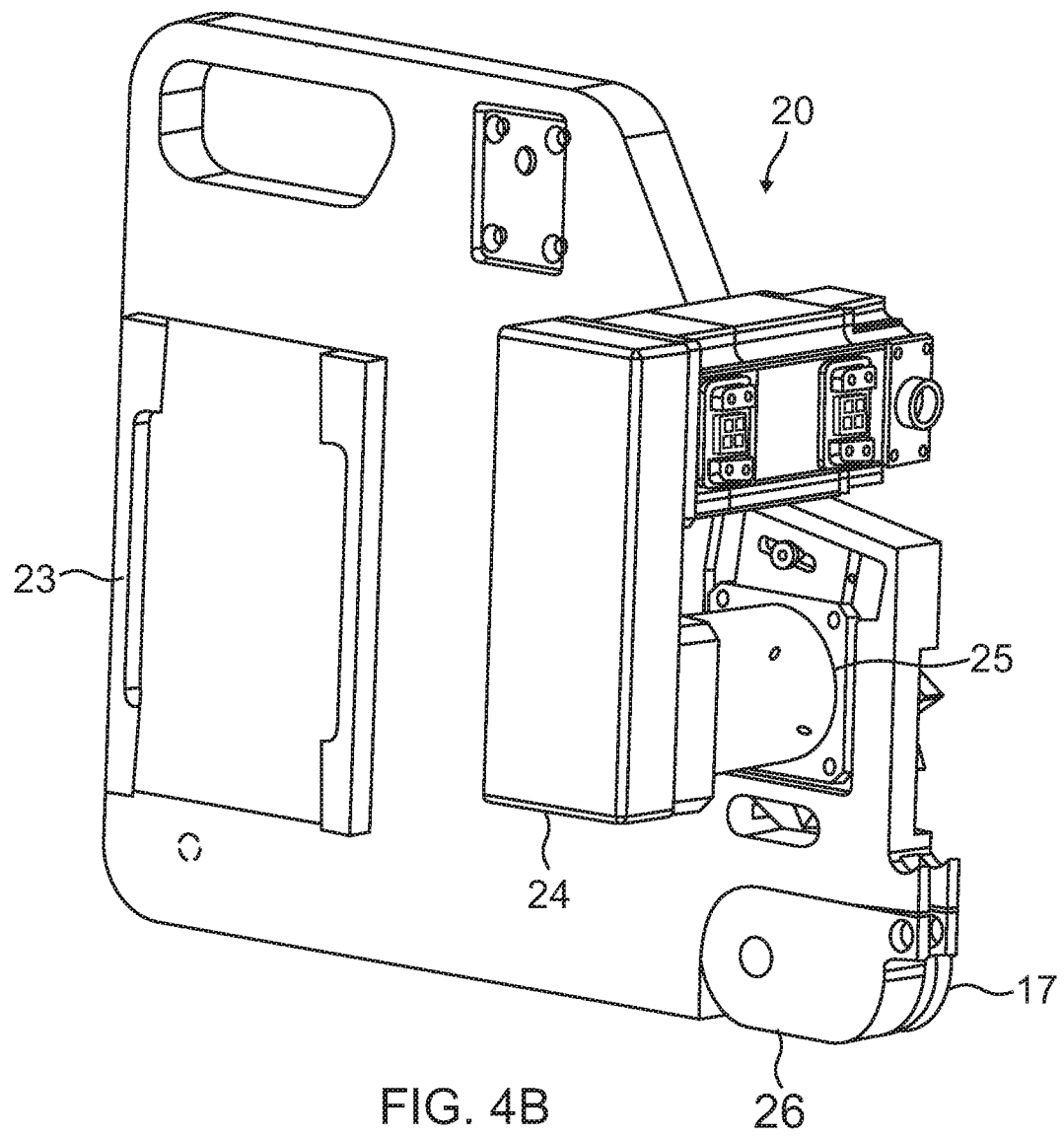

FIG. 4B further illustrates the X-Axis Carriage 20, according to one embodiment, wherein the X-Axis Carriage 20 is attached to the track 12 for positioning the Y-Axis Arm 21 and End Effector 22. The X-Axis Carriage 20 includes a base plate 23, drive motor 24, gear box 25, dual-vee wheels 17 and track release 26. The Y-Axis Arm 21 mounts to the base plate 23. The drive motor 24 and gear box 25 operate a pinion drive that engages with the drive rack 19 on the track 12 shown in FIG. 3B. The dual-vee wheels 17 are rollers guided by the track 12 and mount to the track 12 at the edge guides 18 shown in FIG. 3B. The track release 26 allows for quick detachment of the dual-vee wheels 17 from the track 12.

Figure 4C:
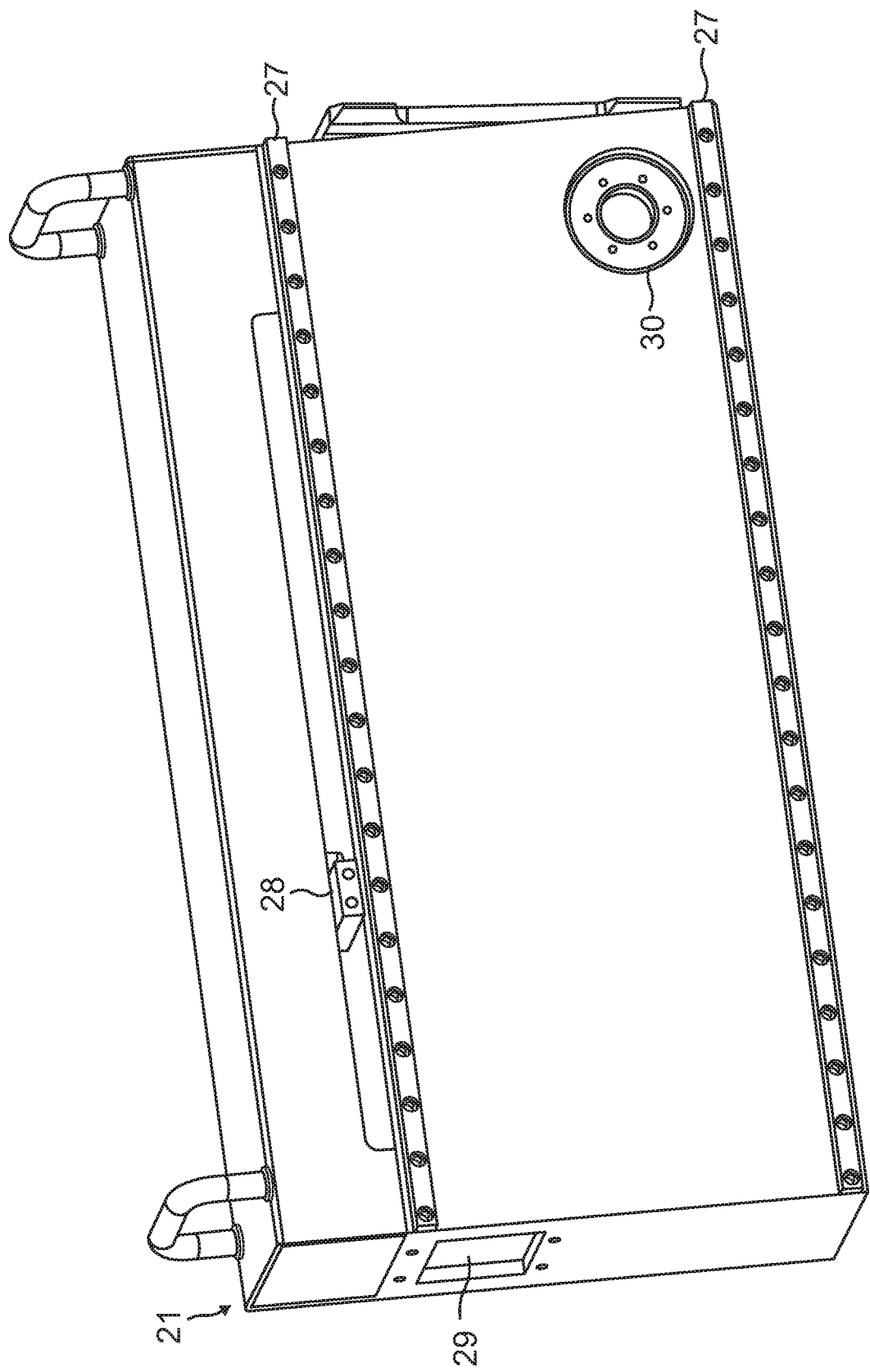

FIG. 4C further illustrates the Y-Axis Arm 21, according to one embodiment. The Y-Axis Arm 21 is attached to the X-Axis Carriage 20 for positioning the End Effector 22. The Y-Axis Arm 21 includes two rails 27, a ball screw 28, a control umbilical connection 29 and an A-Axis Actuator 30. The End Effector 22 is mounted on the rails 27, and the ball screw 28 moves the End Effector 22 along the rails 27. The control umbilical connection 29 connects to a control cabinet, as described in FIGS. 5A-5B below. The A-Axis Actuator 30 changes the angle of the Y-Axis Arm 21.

Figure 4D:
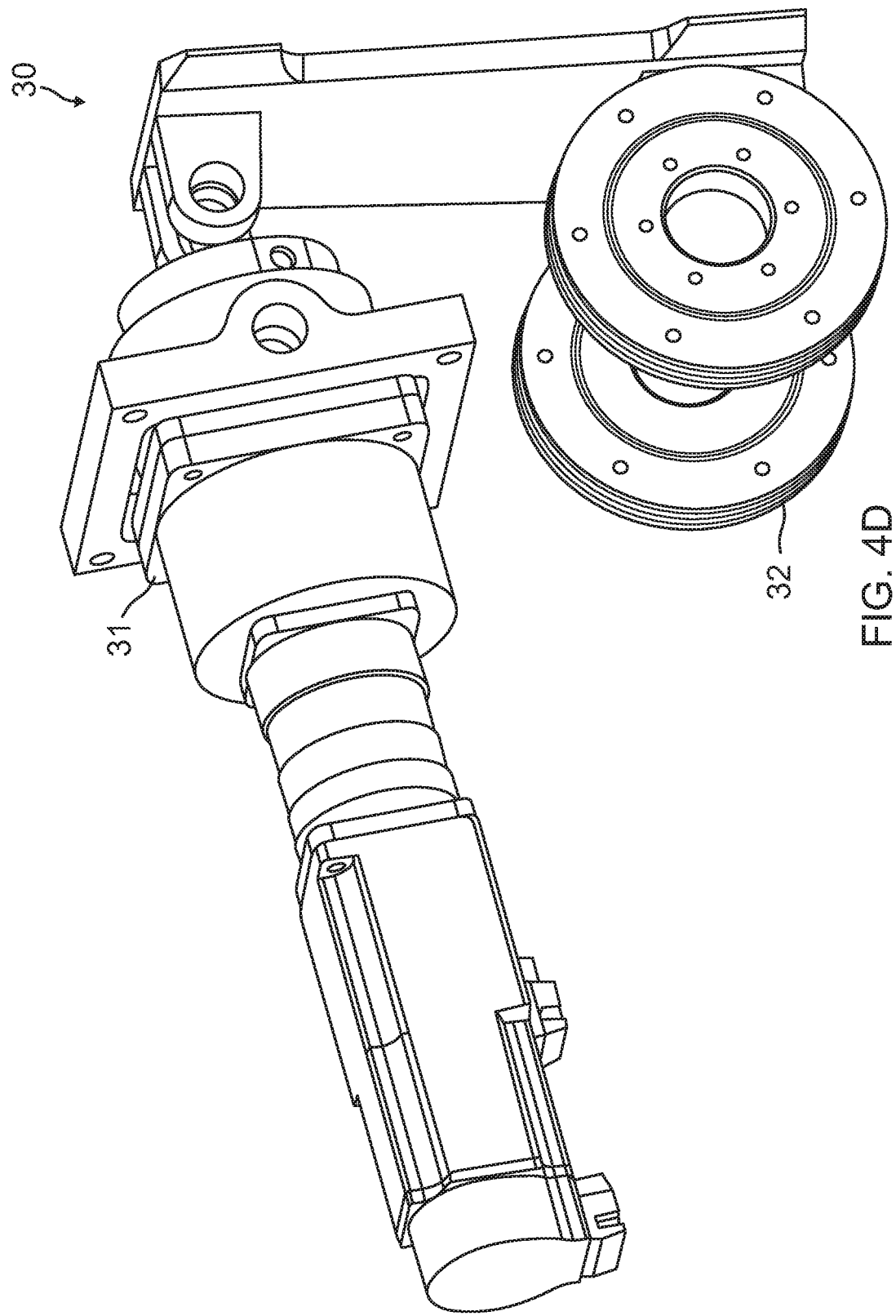

FIG. 4D further illustrates the A-Axis Actuator 30, according to one embodiment. The A-Axis Actuator 30 is located inside the Y-Axis Arm 21, and includes a linear actuator 31 and A-Axis pivot 32 (which is the only portion of the A-Axis Actuator 30 visible on the outside of the Y-Axis Arm 21 in FIG. 4C). The A-Axis pivot 32 is a pivot bearing for positioning the Y-Axis Arm 21 and End Effector 22 at an angle in response to the operation of the linear actuator 31.

Figure 4E:
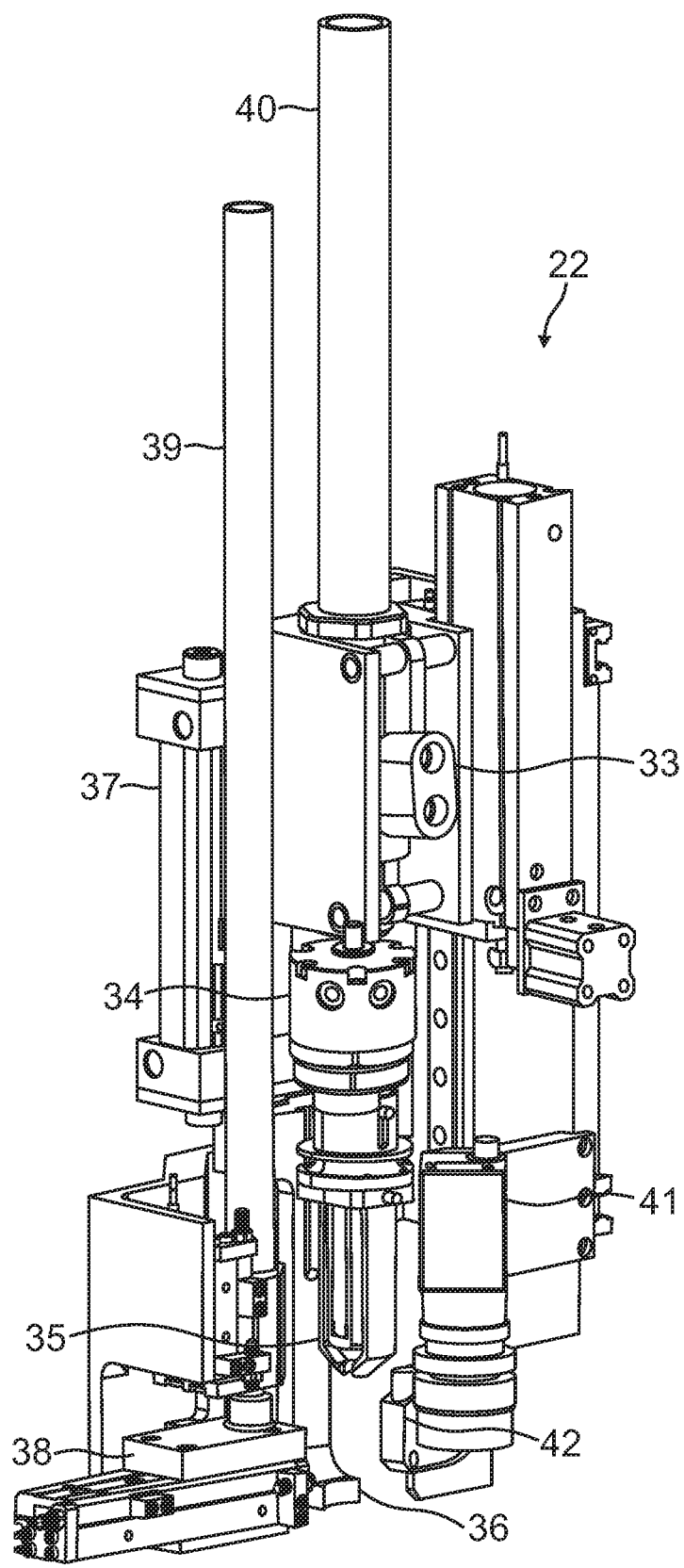

FIG. 4E further illustrates the End Effector 22, according to one embodiment. The End Effector 22 is mounted on the rails 27 of the Y-Axis Arm 21 and swages a collar onto a fastener, as described in more detail below in conjunction with FIGS. 6A-6K. The End Effector 22 includes a pneumatic, hydraulic or electromechanical fastener installation tool 33, rotary actuator 34, collar swager 35, clamp foot 36, clamp cylinder 37, collar feeder 38, collar feeder tube 39, pintail return tube 40, resync camera 41 and normality laser 42. The operation of these elements is described in more detail below in conjunction with FIGS. 6A-6K.

Figure 4F:
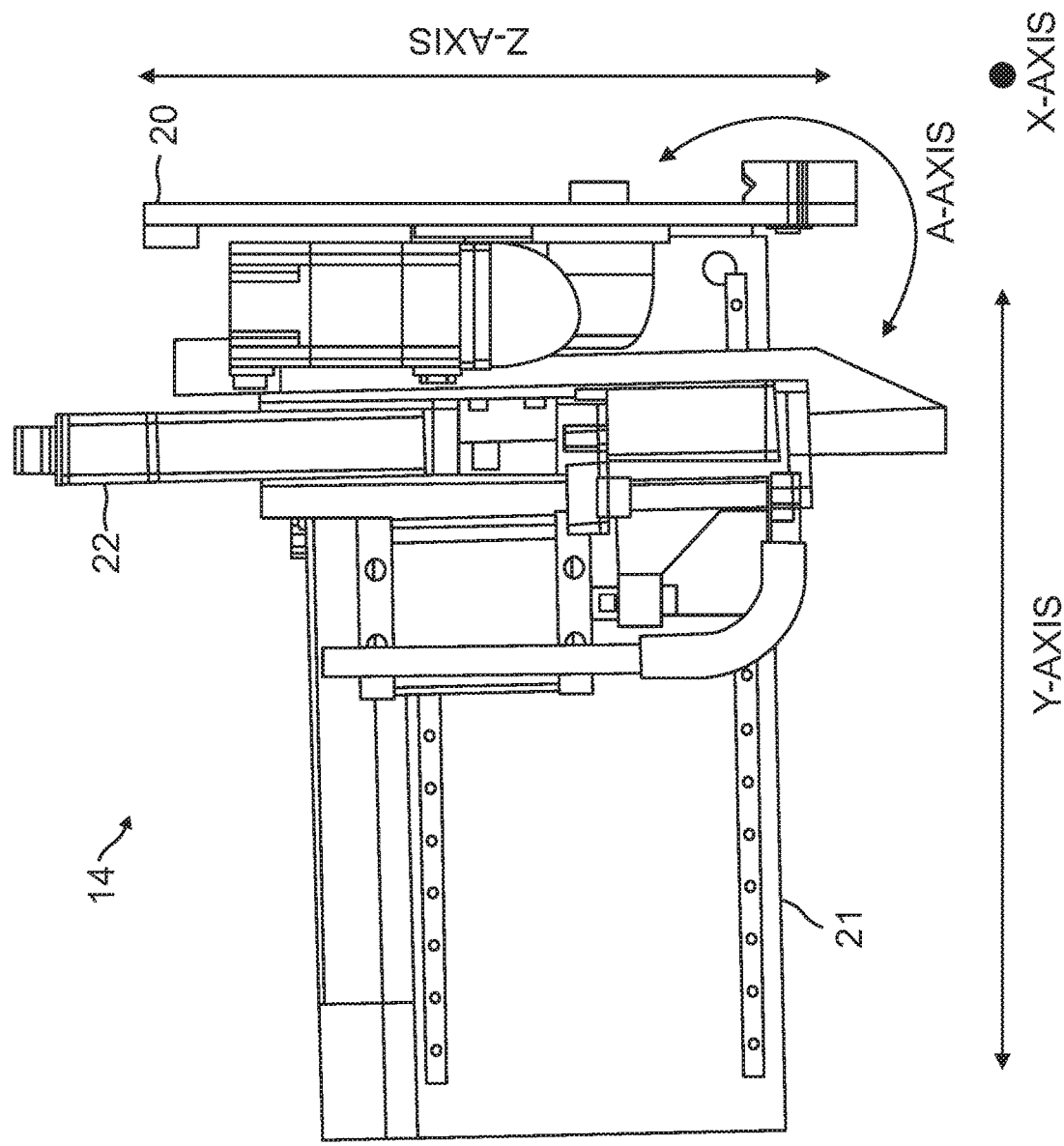
Figure 4G:
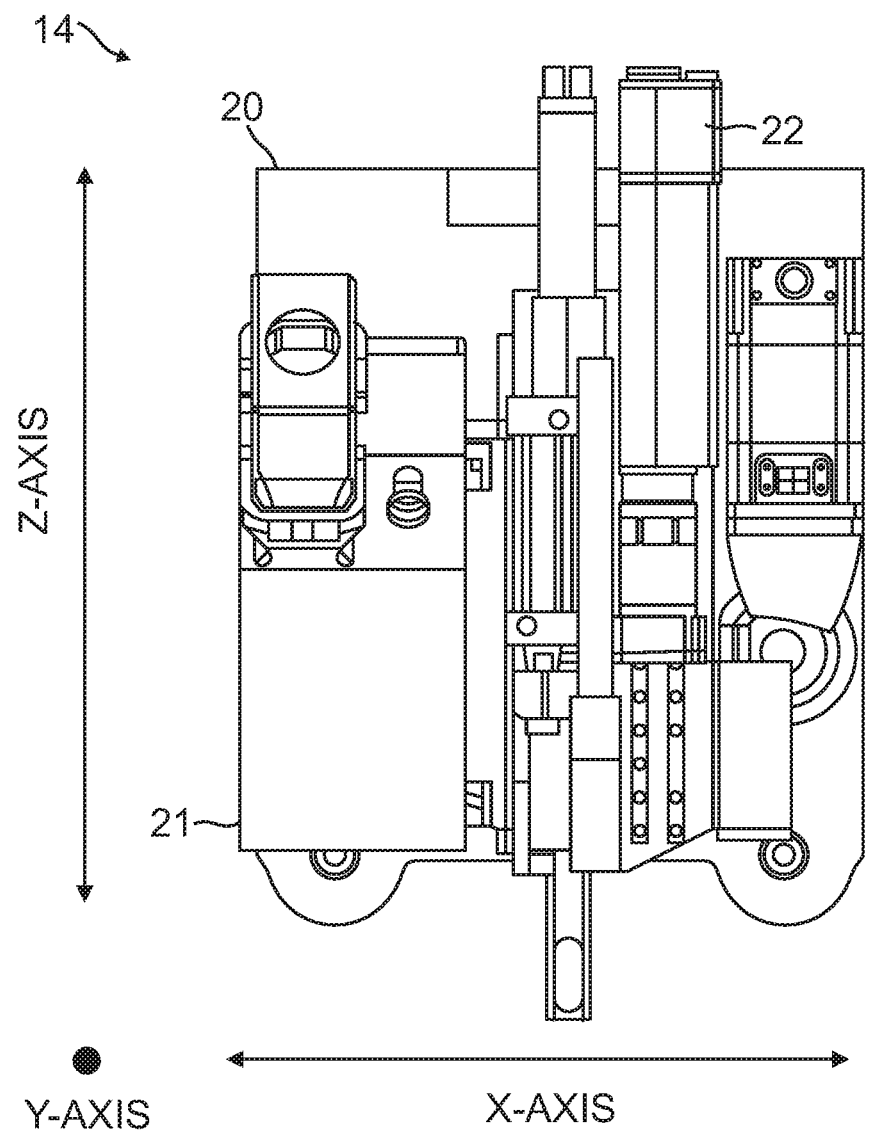
Figure 4H:
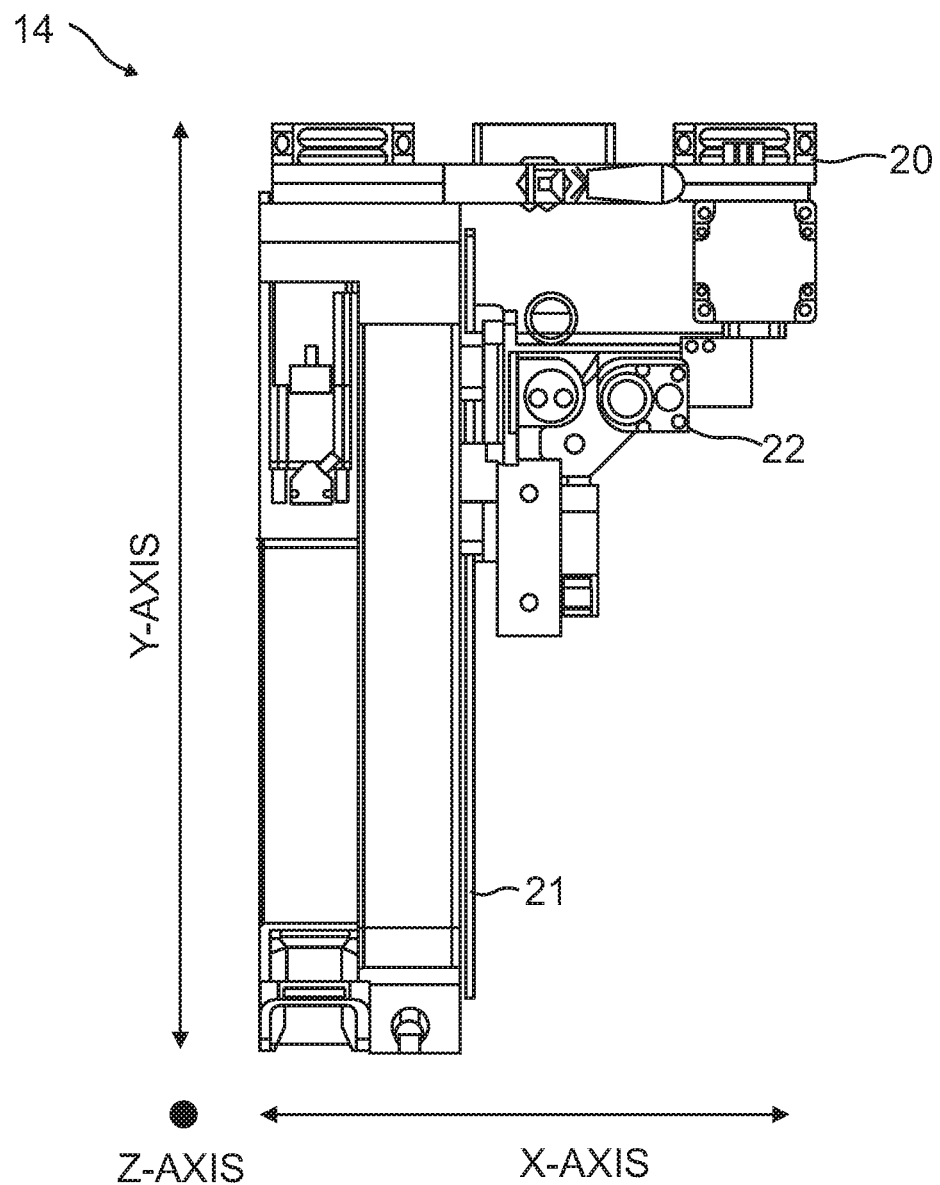

FIGS. 4F, 4G and 4H further illustrate the alignment of the automated fastening machine 14 and its X-Axis Carriage 20, Y-Axis Arm 21 and End Effector 22. Specifically, FIG. 4F is a side view of the automated fastening machine 14 showing the X-Axis (as a point), the Z-Axis, a Y-Axis (perpendicular to both the X-Axis and Z-Axis), and an A-Axis as an angle in a plane formed by the Y-Axis and Z-Axis; FIG. 4G is a rear view of the automated fastening machine 14 showing the Y-Axis (as a point), the Z-Axis, and the X-Axis; and FIG. 4H is a top view of the automated fastening machine 14 showing the Z-Axis (as a point), the X-Axis, and the Y-Axis.

As noted above in FIGS. 2A, 2B and 2C, the track 12 is aligned in both X-Axis and Z-Axis directions and, at any instant, the automated fastening machine 14 is positioned along the track 12 in at least X-Axis and Z-Axis directions, wherein the X-Axis comprises a lateral position within the fuselage 10 and along the track 12, while the Z-Axis comprises a vertical position within the fuselage 10 and along the track 12. The X-Axis Carriage 20 moves the automated fastening machine 14 in the X-Axis and Z-Axis directions of the track 12, and the ball screw 28 of the Y-Axis Arm 21 moves the End Effector 22 along the rails 27 of the Y-Axis Arm 21 in the Y-Axis direction perpendicular to both the X-Axis and Z-Axis directions. The A-Axis Actuator 30 of the Y-Axis Arm 21 moves the End Effector 22 (and the Y-Axis Arm 21 itself) about an angle in the plane formed by the Y-Axis and Z-Axis directions, which comprises the A-Axis.

FIG. 5A provides a system overview of a control system 43 used with the automated fastening machine 14, according to one embodiment. The control system 43 includes a control cabinet 44 which accepts air 45, 480V power 46 and vacuum supply 47, and is connected to the automated fastening machine 14 via a control umbilical 48, hydraulic lines 49, collar feeder tube 50 and pintail return tube 51. The control cabinet 44 may include an operator interface thereon, and may accept controls from a laptop 52 and/or handheld mobile operator's pendant (HMOP) 53.

The laptop 52 includes a touch screen that allows the control cabinet 44 to be operated as if the operator was at the main interface of the control cabinet 44. The laptop 52 can be easily taken into the fuselage 10 to allow the operator to have full control of the control cabinet 44 from anywhere.

Alternatively, the HMOP 53 may be used. The HMOP 53 allows for simple machine operation, and displays abbreviated operator messages.

One embodiment provides independent machine control. Specifically, the control cabinet 44 provides commands for the inside machine, namely, the automated fastening machine 14, and the outside machine, namely, the multi-axis drilling machine positioned on the outside of the fuselage 10, is controlled independently. The benefits of this approach are that the software easier to develop and debug; and there is a single operator interface. The disadvantages of this approach are that: each outside machine must be paired with an inside machine; each outside machine will only work with one specific inside machine and the machines are not interchangeable; if an outside machine is down, then the paired inside machine is down as well; and disruption of communication between outside and inside machine will cause a full system failure.

Another embodiment provides dependent machine control. Specifically, the control cabinet 44 provides commands for an inside machine, namely, the automated fastening machine 14, and communicates with another control cabinet 54 via a communications link 55, wherein the control cabinet 54 provides command for an outside machine, namely, the multi-axis drilling machine positioned on the outside of the fuselage 10, so that the automated fastening machine 14 is coordinated with the outside machine on an opposite side of the first surface that drills the holes and inserts the fasteners in the holes. The benefits of this approach are that machines are interchangeable, i.e. any outside machine will work with any inside machine; communications failure between machines will not cause complete system failure; inside machines can be connected "on the fly" to outside machines; the outside machine handles all programming and has complete control over the inside machine; and only a communication umbilical is needed to connect the inside machine to the outside machine. The disadvantages of this approach are that: programming is more complicated; maintenance is more complicated; and each machine has its own control cabinet 44, 54.

FIG. 5B further illustrates the control cabinet 44, according to one embodiment. The control cabinet 44 includes a collar feeder 56 for feeding collars, an emergency stop (E-Stop) button 57, a control umbilical connection 58 to the automated fastening machine 14, a power disconnect 59, a hydraulic power unit 60 for providing hydraulic power to the automated fastening machine 14, hoist rings 61 for hoisting the control cabinet 44, and a pendant mount 62 for storing the HMOP 53.

FIGS. 6A-6K illustrate a sequence of fastening steps performed by the automated fastening machine 14 as directed by the control system 43 to swage collars onto fasteners, according to one embodiment.

FIG. 6A further illustrates the components of the End Effector 22, as well as a first step performed by the End Effector 22, wherein the End Effector 22 is positioned above a surface 63 having a hole 64 therein through which a fastener (not shown) is inserted. (A fastener is shown and described in conjunction with FIGS. 6I, 6J and 6K below.) In one embodiment, the surface 63 is the first surface 10B, namely the inside surface 10B of the fuselage 10.

In this first step, the automated fastening machine 14 uses the resync camera 41 to align the End Effector 22 with regard to one or more datum features (e.g., hole 64) on the surface 63, for example, either the inner cylindrical hole 64 walls or the rim of the hole 64. The automated fastening machine 14 drives to a nominal target location on the track 12, captures a high resolution digital image of the features on the surface 63 using the resync camera 41, and determines an offset between an actual feature location and the nominal target location. The outside machine performs a similar process, allowing both machines to have a common reference to the fuselage 10 and therefore each other.

Once positioned, the automated fastening machine 14 then uses the normality laser 42 to position the End Effector 22 normal to the surface 63, although other sensors may be used for this function as well. Specifically, the automated fastening machine 14 uses the signals from the normality laser 42 to rotate the Y-axis Arm 21 and End Effector 22 to achieve a substantially perpendicular orientation of the End Effector 22 to the surface 63. Once aligned, the End Effector 22 performs the following steps.

FIG. 6B illustrates a next step performed by the End Effector 22, wherein the load pin slide 65 positions the load pin 66 underneath the collar feed tube 39 and the clamp cylinder 37 extends the clamp foot 36 to engage the surface 63 adjacent the hole 64. The clamp foot 36 is a pressure foot and the clamp cylinder 37 is a pneumatic, hydraulic or electromechanical cylinder capable of providing about 200 foot-pounds (lbf) of force for the clamp foot 36 on the surface 63 as a reaction force prior to and during the drilling of the hole 64.

Specifically, the clamp foot 36 provides a clamp-up force for a one-up assembly (OUA) process used in the fastening steps. OUA is where the assembly is performed one time, namely drilled, inspected, and ultimately fastened, without removal of components for deburring, cleaning, sealing, etc. In the OUA process, the outside machine uses a stack of components to perform the drilling of the hole 64 in the surface and the insertion of the fastener in the hole 64.

Here, the track 12 mounted on the aft pressure bulkhead 11 provides a foundation for the clamp-up force generated by the clamp foot 36, maintaining joint integrity and interfaces separation for the OUA stack, before the outside machine starts drilling. The outside machine is positioned such that its drill nose pushes on an opposite side of the surface 63 (i.e., the outside surface 10A of the fuselage 10), while normalizing to a contour of the opposite side of the surface 63. Similarly, the automated fastening machine 14 is positioned such that the clamp-up force generated by the clamp foot 36 is aligned with the drill nose of the outside machine.

FIG. 6C illustrates a next step performed by the End Effector 22, wherein a collar 67 is blown onto the load pin 66 from the collar feed tube 39 with compressed air.

FIG. 6D illustrates a next step performed by the End Effector 22, wherein the collar 67 is held on the load pin 66 with a side air jet 68 and the collar feeder tube 39 is retracted.

FIG. 6E illustrates a next step performed by the End Effector 22, wherein the load pin slide 65 is extended and positioned under the collar swager 35, so that the collar 67, while still held on the load pin 66, is positioned between the feed fingers 69 of the collar swager 35.

FIG. 6F illustrates a next step performed by the End Effector 22, wherein the collar swager 35 first moves forward to push the collar 67 against the feed fingers 69 and the collar swager 35 moves back to its most rearward position to clear the load pin 66. At this stage, the collar 67 is clear of the load pin 66.

FIG. 6G illustrates a next step performed by the End Effector 22, wherein the load pin slide 65 is retracted away from the collar swager 35, and the collar 67 is firmly seated in the feed fingers 69 of the collar swager 35. Directly above or behind the collar 67 is a swage die 70 in the collar swager 35.

FIG. 6H illustrates a next step performed by the End Effector 22, wherein the collar swager 35 advances toward the surface 63.

FIG. 6I illustrates a next step performed by the End Effector 22, wherein a fastener 71 is inserted through the hole 64 in the surface 63, e.g., from an opposite side from the surface 63, and the collar swager 35 advances toward the fastener 71.

FIG. 6J illustrates a next step performed by the End Effector 22, wherein the collar 67 is seated on the end of the fastener 71 by the collar swager 35. Once the collar 67 is on the end of the fastener 71, the feed fingers 69 of the collar swager 35 are opened by a feature in the side of the clamp foot 36. The collar swager 35 pushes the collar 67 further onto the fastener 71, and the collar 67 is swaged by the fastener installation tool 33, which provides a force to the swage die 70. In one embodiment, the collar 67 is a loose fitting metal ring that is deformed by the die 70 around the fastener 71, which includes locking grooves. The die 70 is forced down onto the collar 67 by the fastener installation tool 33, which reduces the diameter of the collar 67 and progressively swages the collar 67 material into the die 70. As the force applied to the die 70 increases, installation is completed when a pintail 72 of the fastener 71 breaks off.

FIG. 6K illustrates a next step performed by the End Effector 22, wherein the collar 67 has been swaged on the fastener 71. The collar swager 35 is retracted to strip the swage die 70 off the swaged collar 67, and the pintail (not shown) is vacuumed out through the pintail return tube 40 to a collection point, for example, at the control cabinet 44. Finally, the resync camera 41 may be used for inspecting the swaged collar 67 on the fastener 71.

FIG. 7 is a flowchart that further illustrates the sequence of fastening steps performed by the End Effector 22 in FIGS. 6A-6K.

Block 73 represents the step of positioning the End Effector 22 with regard to the surface 63 (i.e., the inside surface 10B of the fuselage 10 structure) having the hole 64 therein through which the fastener 71 is inserted. Specifically, Block 73 represents the step of aligning the End Effector 22 with regard to one or more features on the inside surface 63 using the resync camera 41 of the End Effector 22, which results in aligning the automated fastening machine 14 with another machine (i.e., the automated multi-axis drilling machine positioned on the outside surface 10A of the fuselage 10 structure). Block 73 also represents the step of positioning the End Effector 22 relative to the inside surface 63 using the normality laser 42 sensor of the End Effector 22, wherein the positioning comprises rotating the Y-Axis Arm 21 and End Effector 22 to achieve a substantially perpendicular orientation relative to the inside surface 63 using signals from the normality laser 42 sensor.

Block 74 represents the step of using the clamp cylinder 37 to extend the clamp foot 36 to engage the surface 63 adjacent the hole 64 where the fastener 71 will be installed. Specifically, Block 74 represents the step of clamping up the inside surface 63 using a force applied by the clamp foot 36 of the End Effector 22, wherein the force is applied for a one-up assembly (OUA) process used in the fastening steps.

The remaining Blocks 75-84 represent the step of installing the fastener 71 inserted through the hole 64 using the various components of the End Effector 22.

Block 75 represents the step of using the load pin slide 65 to position the load pin 66 underneath the collar feed tube 39.

Block 76 represents the step of blowing a collar 67 onto the load pin 66 from the collar feed tube 39 with compressed air.

Block 77 represents the step of using a side jet 68 to hold the collar 67 on the load pin 66.

Block 78 represents the step of retracting the collar feeder tube 39.

Block 79 represents the step of extending the load pin slide 65 to position it under the collar swager 35, so that the collar 67, while still held on the load pin 66, is positioned between the feed fingers 69 of the collar swager 35;

Block 80 represents the step of moving the collar swager 35 forward to push the collar 67 against the feed fingers 69 and then moving the collar swager 35 to clear the load pin 66, so that the collar 67 is clear of the load pin 66.

Block 81 represents the step of retracting the load pin slide away from the collar swager 35, wherein the collar 67 is firmly seated in the feed fingers 69 of the collar swager 35.

Block 82 represents the step of advancing the collar swager 35 toward the surface 63 and the fastener 71 inserted through the hole 64 in the surface 63.

Block 83 represents the step of using the collar swager 35 to seat the collar 67 on the end of the fastener 71, wherein the feed fingers 69 of the collar swager 35 are opened, the collar 67 is pushed onto the fastener 71, and the collar 67 is swaged by the fastener installation tool 33, such that the swage die 70 is forced down onto the collar 67 by the fastener installation tool 33, which reduces the diameter of the collar 67 and progressively swages the collar 67 material into the die 70, and installation is completed when a pintail 72 of the fastener 71 breaks off.

Block 84 represents the step of retracting the collar swager 35 to strip the swage die 70 off the swaged collar 67, vacuuming the pintail out through the pintail return tube to a collection point, and optionally inspecting the swaged collar 67 on the fastener 71.

Benefits

The cantilevered track 12 described herein includes a number of benefits and advantages. One advantage is that the automated fastening machine 14 only mounts to one rail, i.e., track 12, which provides for ease of setup. Another advantage is that the automated fastening machine 14 can easily be removed from track 12.

On the other hand, there are some disadvantages. One disadvantage is that the roughness of the inside surface of the fuselage 10 makes it difficult to mount the track 12 on the inside surface of the fuselage 10. Another disadvantage is that interior structures may interfere with movement of the automated fastening machine 14 along the track 12.

Alternatives

A number of alternatives and modifications are available.

For example, although an automated fastening machine is described herein, there are other opportunities for automation inside the fuselage 10. An automated fastening machine inside the fuselage 10 may also include functions for drilling holes and filling holes (i.e., inserting bolts), deburring, vacuuming for FOD (Foreign Object Damage or Debris) control, sealing, all types of fastening (torqueing, swaging, riveting), and inspection. An automated fastening machine inside the fuselage 10 may include different end effectors with multiple features than those disclosed herein.

In another example, automation inside the fuselage 10 can also synchronize its functions with automation outside the fuselage 10, with or without camera assistance, for rate improvement. This is especially true if used with a track that is indexed and mounted on the outside of the fuselage 10. As noted previously, the inside automation can work with the outside automation for any of these additional functions, if desired.

In yet another example, a track inside the fuselage 10 can be flexible or hard mounted to structures or surfaces inside the fuselage 10 with or without vacuum cups. Therefore, inside automation can apply to any section of the fuselage 10, and is not limited to the aft pressure bulkhead 11.

In still another example, a track inside the fuselage 10 may not be a cantilever design mounted on the aft pressure bulkhead 11.

In one example, FIG. 8A illustrates a Bridge-style automated fastening machine 85 wherein the dual tracks 86 are mounted to a structure or surface 10B inside the fuselage 10 on a forward side and the aft pressure bulkhead 11 of the fuselage 10 on an aft side. One advantage is that the Bridge-style machine 85 could potentially not have an active A-Axis, and instead could passively normalize between tracks 86. Another advantage is that, if a 200 lb. clamp is needed for all holes, this design distributes the load between both tracks 86 well. One disadvantage to the Bridge style machine 85 is that two sets of tracks 86 are required. The tracks 86 may need to be aligned to each other to create proper normality, wherein track 86 spacing, relative height and distance apart will need to be controlled.

In another example, FIG. 8B illustrates a cantilevered automated fastening machine 87 mounted to a structure or surface 10B inside the fuselage 10 on a forward side of a splice, wherein the cantilevered automated fastening machine 87 has a reaction support forward of that mount. One advantage is that the cantilevered machine 87 does not require mounting on the aft pressure bulkhead 11 with vacuum cups. One disadvantage is that the cantilevered machine 87 will probably need an active B-Axis and will have to set up multiple tracks/guides. Also, the cargo floor/frame may have to react large loads.

Airplane Assembly

Embodiments of the disclosure may be described in the context of an aircraft manufacturing and service method as shown in FIG. 9A and an aircraft as shown in FIG. 9B.

As shown in FIG. 9A, during pre-production, exemplary method 88 may include specification and design 89 of the aircraft and material procurement 90. During production, component and subassembly manufacturing 91 and system integration 92 of the aircraft takes place, which include the factory level automation described herein, using the compound contour vacuum track 12 and automated fastening machine 14 for automation of final assembly from the interior of the fuselage 10. Thereafter, the aircraft may go through certification and delivery 93 in order to be placed in service 94. While in service by a customer, the aircraft is scheduled for routine maintenance and service 95 (which includes modification, reconfiguration, refurbishment, and so on), that also includes the factory level automation described herein, using the compound contour vacuum track 12 and automated fastening machine 14 for automation of final assembly from the interior of the fuselage 10.

Each of the processes of method 88 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 9B, the aircraft 96 produced by exemplary method of FIG. 9A may include an airframe 97 with a plurality of systems 98 and an interior 99. Examples of high-level systems 98 include one or more of a propulsion system 100, an electrical system 101, a hydraulic system 102, and an environmental system 103. Any number of other systems may be included. Although an aerospace example is shown, the principles of the invention may be applied to other industries, such as the automotive industry.

Apparatus and methods embodied herein may be employed during any one or more of the stages of the production and service method 88. For example, components or subassemblies corresponding to production process 91 may be fabricated or manufactured in a manner similar to components or subassemblies produced while the aircraft 96 is in service. Also, one or more apparatus embodiments, method embodiments, or a combination thereof may be utilized during the production stages 91 and 92, for example, by substantially expediting assembly of or reducing the cost of an aircraft 96. Similarly, one or more of apparatus embodiments, method embodiments, or a combination thereof may be utilized while the aircraft 96 is in service, for example and without limitation, to maintenance and service 95.

What is claimed is:

1. A device for fastening a structure, comprising:
    a track configured to be mounted for accessing a first surface of the structure, wherein the structure is an aircraft fuselage, the first surface is an inside surface of the aircraft fuselage, and the first surface has one or more holes through which fasteners are inserted;
    wherein the track is aligned and mounted with a length along X-Axis and Z-Axis directions within the structure, wherein the X-Axis direction comprises a lateral position within the structure, and the Z-Axis direction comprises a vertical position within the structure;
    wherein the track is shaped along the length to match the first surface and the track is configured to be mounted on a second surface comprising an aft pressure bulkhead within the aircraft fuselage so that a width of the track is cantilevered from the second surface at an angle ranging from 80 degrees to 100 degrees to the first surface;
    wherein an automated fastening machine is mounted on the track to traverse the track while performing fastening functions on the first surface;
    wherein the automated fastening machine is positioned along the track in at least the X-Axis and Z-Axis directions, and an end effector of the automated fastening machine is moved in a Y-Axis direction perpendicular to both the X-Axis and Z-Axis directions; and
    wherein the track allows the automated fastening machine to make contact with the first surface, such that the automated fastening machine aligns with the holes in the first surface, and the end effector of the automated fastening machine installs the fasteners in the holes.

2. The device of claim 1, wherein the width of the track is at an angle of about 90 degrees to the first surface.

3. The device of claim 1, wherein the automated fastening machine is positioned along the track in at least the X-Axis and Z-Axis directions.

4. The device of claim 1, wherein the track is comprised of one or more sections, and splices are used for connecting between the sections.

5. The device of claim 1, wherein the track is mounted interior to the structure using one or more removable attachment devices.

6. The device of claim 1, wherein the track includes a drive rack for engaging and moving the automated fastening machine along the track.

7. The device of claim 6, wherein the automated fastening machine includes a pinion drive that engages with the drive rack on the track for moving the automated fastening machine along the track.

8. The device of claim 1, wherein the automated fastening machine is mounted on the track across the width of the track to traverse the track along the length of the track while performing the fastening functions on the first surface of the structure.

9. A method for fastening a structure, comprising:
    mounting a track for accessing a first surface of the structure, wherein the structure is an aircraft fuselage, the first surface is an inside surface of the aircraft fuselage, and the first surface has one or more holes through which fasteners are inserted;
    wherein the track is aligned and mounted with a length along X-Axis and Z-Axis directions within the structure, wherein the X-Axis direction comprises a lateral position within the structure and the Z-Axis direction comprises a vertical position within the structure;

wherein the track is shaped along the length to match the first surface and the track is mounted on a second surface comprising an aft pressure bulkhead within the aircraft fuselage so that a width of the track is cantilevered from the second surface at an angle ranging from 80 degrees to 100 degrees to the first surface; and mounting an automated fastening machine on the track to traverse the track while performing fastening functions on the first surface;

wherein the automated fastening machine is positioned along the track in at least the X-Axis and Z-Axis directions, and an end effector of the automated fastening machine is moved in a Y-Axis direction perpendicular to both the X-Axis and Z-Axis directions; and wherein the track allows the automated fastening machine to make contact with the first surface, such that the automated fastening machine aligns with the holes in the first surface, and the end effector of the automated fastening machine installs the fasteners in the holes.

10. The method of claim 9, wherein the width of the track is at an angle of about 90 degrees to the first surface.

11. The method of claim 9, wherein mounting the automated fastening machine comprises mounting the automated fastening machine such that the automated fastening machine is positioned along the track in at least the X-Axis and Z-Axis directions.

12. The method of claim 9, wherein the track is comprised of one or more sections, and splices are used for connecting between the sections.

13. The method of claim 9, wherein the track is mounted interior to the structure using one or more removable attachment devices.

14. The method of claim 9, wherein the track includes a drive rack for engaging and moving the automated fastening machine along the track.

15. The method of claim 14, wherein the automated fastening machine includes a pinion drive that engages with the drive rack on the track for moving the automated fastening machine along the track.

16. The method of claim 9, wherein the automated fastening machine is mounted on the track across the width of the track to traverse the track along the length of the track while performing the fastening functions on the first surface of the structure.

* * * * *